(12) United States Patent
Cook et al.

(10) Patent No.: US 10,013,355 B1
(45) Date of Patent: Jul. 3, 2018

(54) CACHE MANAGEMENT IN A STREAM COMPUTING ENVIRONMENT THAT USES A SET OF MANY-CORE HARDWARE PROCESSORS

(71) Applicant: INTERNATIONAL BUSINESS MACHINES CORPORATION, Armonk, NY (US)

(72) Inventors: Alexander Cook, Rochester, MN (US); Cory J. Kleinheksel, Ames, IA (US); David M. Koster, Rochester, MN (US); Jason A. Nikolai, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/724,360

(22) Filed: Oct. 4, 2017

Related U.S. Application Data

(63) Continuation of application No. 15/449,952, filed on Mar. 4, 2017.

(51) Int. Cl.
*G06F 12/00* (2006.01)
*G06F 12/0842* (2016.01)
(Continued)

(52) U.S. Cl.
CPC .......... *G06F 12/0842* (2013.01); *G06F 13/14* (2013.01); *G06F 13/161* (2013.01); *G06F 13/1652* (2013.01); *G06F 13/1657* (2013.01); *G06F 13/1663* (2013.01); *G06F 13/18* (2013.01); *G06F 2212/62* (2013.01)

(58) Field of Classification Search
CPC .. G06F 12/0842; G06F 2212/62; G06F 13/14; G06F 13/161; G06F 13/1652; G06F 13/1657; G06F 13/1663; G06F 13/18
See application file for complete search history.

(56) References Cited

U.S. PATENT DOCUMENTS 9,298,801 B2 * 3/2016 Branson ............ G06F 17/30598
9,485,310 B1   11/2016 Bono et al.
(Continued)

OTHER PUBLICATIONS

IBM, List of IBM Patents or Patent Applications Treated as Related, Appendix P, dated Oct. 4, 2017, 2 pages.
(Continued)

*Primary Examiner* — Shawn X Gu
(74) *Attorney, Agent, or Firm* — Anthony R. Curro

(57) ABSTRACT

Disclosed aspects relate to cache management in a stream computing environment that uses a set of many-core hardware processors to process a stream of tuples by a plurality of processing elements which operate on the set of many-core hardware processors. The stream of tuples to be processed by the plurality of processing elements which operate on the set of many-core hardware processors may be received. A tuple-processing hardware-route on the set of many-core hardware processors may be determined based on a cache factor associated with the set of many-core hardware processors. The stream of tuples may be routed based on the tuple-processing hardware-route on the set of many-core hardware processors. The stream of tuples may be processed by the plurality of processing elements which operate on the set of many-core hardware processors.

1 Claim, 14 Drawing Sheets

(51) Int. Cl.
*G06F 13/16* (2006.01)
*G06F 13/14* (2006.01)
*G06F 13/18* (2006.01)

(56) References Cited

U.S. PATENT DOCUMENTS

2008/0320235 A1  12/2008  Beckmann et al.
2013/0117753 A1  5/2013  Gounares et al.

OTHER PUBLICATIONS

Pending U.S. Appl. No. 15/449,952, filed Mar. 4, 2017, entitled: "Cache Management in a Stream Computing Environment That Uses a Set of Many-Core Hardware Processors", 95 pages.
Zheng et al.; "Cache Topology Aware Mapping of Stream Processing Applications onto CMPs"; IEEE Xplore Digital Library; 2013. <http://ieeexplore.ieee.org/documenl/6681575/?reload=true>.
Sermulins, et al.; "Cache Optimizations for Stream Programs"; Department of Electrical Engineering and Computer Science, Massachusetts Institute of Technology; May 2005. <http://groups.csail.mil.edu/commil/papers/05/sermulins-ctes05.pdf>.
Yoo et al.; "Locality-Aware Task Management for Unstructured Parallelism: A Quantitative Limit Study"; ACM Digital Library; Jun. 25, 2013. <http://csl.stanford.edu/-christos/publications/2013.localityaware.spaa.pdf>.
Sermulins, et al.; "Cache aware optimization of stream programs"; ACM Digital Library; Jun. 2005. <http://dl.acm.org/citation.cfm?id=1065927>.
Intel Corporation; "Intel Many Integrated Core Architecture—Advanced"; Oct. 19, 2016. <http://www.intel.com/ ::ontenl/www/us/en/architecture-and-technology/many-integrated-core/intel-many-integrated-wre-architecture.html>.
Intel Corporation; "Intel Xeon Phi X100 Family Coprocessor—the Architecture"; Nov. 12, 2012. <hllps://software.Intel.com/en-us/articles/intel-xeon-phi-coprocessor-codename-knights-comer>.
Morgan, Timothy Prickett; "More Knights Landing Xeon Phi Secrets Unveiled"; Mar. 25, 2015.<http://web.archive.org/,veb/20160417181231/http://www.nextplalform.com/2015/03/25/more-knights-landing-xeon-phi-secrets-unveiled/>.
Funk, Mark; "Thoughts and Conjecture on Knights Landing Near Memory"; Apr. 28, 2015. <http://web.archive.org/ ,veb/20160221101536/hllp://www .nextplalform.com/2015/04/28/thoughts-and-conjecture--0n-knights-landing-near-memory/>.

* cited by examiner

1200

| | | | | |
|---|---|---|---|---|
| Instruction | Initialize | X = 2 + 3 | Y = 3 + x | Z = x + y |
| Cache (1) | 2 | 2 | 2 | 13 |
| Cache (2) | 3 | 3 | 3 | 3 |
| Cache (3) | - | 5 | 5 | 5 |
| Cache 4 | - | - | 8 | 8 |

|  | Recv(1) = 7 | Recv(2) = 2 | Recv(3) = 6 | Recv(4) = 1 |
|---|---|---|---|---|
| Instruction | Waiting | S(1) = R(1) + R(2) | S(2) = R(2) + R(3) | S(3) = R(3) + R(4) |
| Cache (1) | 7 | 7 | 7 → 8 | 8 |
| Cache (2) | - | 2 | 2 | 2 → 7 |
| Cache (3) | - | 9 | 9 | 9 → 1 |
| Cache 4 | - | - | 6 | 6 |

FIG. 13

CACHE MANAGEMENT IN A STREAM COMPUTING ENVIRONMENT THAT USES A SET OF MANY-CORE HARDWARE PROCESSORS

BACKGROUND

This disclosure relates generally to computer systems and, more particularly, relates to cache management in a stream computing environment that uses a set of many-core hardware processors to process a stream of tuples by a plurality of processing elements which operate on the set of many-core hardware processors. Management of data may be desired to be performed as efficiently as possible. As data needing to be managed increases, the need for cache management in a stream computing environment that uses a set of many-core hardware processors may also increase.

SUMMARY

Aspects of the disclosure relate to cache management in a stream computing environment that uses a set of many-core hardware processors to process a stream of tuples by a plurality of processing elements which operate on the set of many-core hardware processors. Cache memory of a set of many-core hardware processors may be managed based on the processor architecture of the set of many-core hardware processors as well as the characteristics of stream applications to be processed by the set of many-core hardware processors to facilitate efficient task scheduling. Based on the nature of the processor architecture and the structure of streaming applications, a tuple-processing hardware route may be determined to route tuples to local cache memory for processing. Sequential stream operators may be placed on local processor cores to limit read and write operations between different processor cores. Single-job tenancy may be prioritized with respect to the set of many-core hardware processors to promote cache hits.

Disclosed aspects relate to cache management in a stream computing environment that uses a set of many-core hardware processors to process a stream of tuples by a plurality of processing elements which operate on the set of many-core hardware processors. The stream of tuples to be processed by the plurality of processing elements which operate on the set of many-core hardware processors may be received. A tuple-processing hardware-route on the set of many-core hardware processors may be determined based on a cache factor associated with the set of many-core hardware processors. The stream of tuples may be routed based on the tuple-processing hardware-route on the set of many-core hardware processors. The stream of tuples may be processed by the plurality of processing elements which operate on the set of many-core hardware processors.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 12 illustrates an example of cache management in a stream computing environment that uses a set of many-core hardware processors to process a stream of tuples by a plurality of processing elements which operate on the set of many-core hardware processors, according to embodiments.

FIG. 13 illustrates an example system for cache management in a stream computing environment that uses a set of many-core hardware processors to process a stream of tuples by a plurality of processing elements which operate on the set of many-core hardware processors, according to embodiments.

Figure 1:
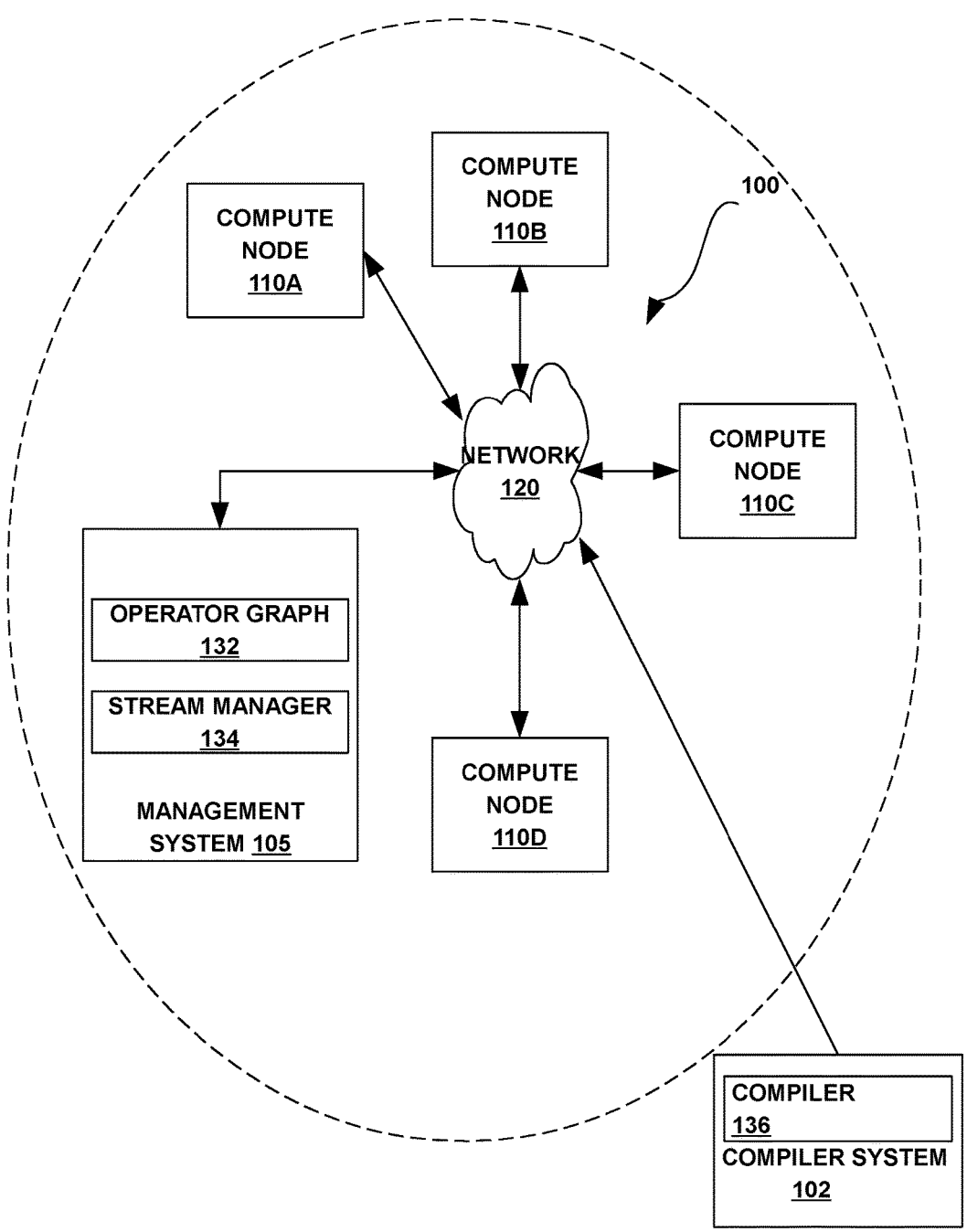
FIG. 1 illustrates an exemplary computing infrastructure to execute a stream computing application according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to cache management in a stream computing environment that uses a set of many-core hardware processors to process a stream of tuples by a plurality of processing elements which operate on the set of many-core hardware processors. Cache memory of a set of many-core hardware processors may be managed based on the processor architecture of the set of many-core hardware processors as well as the characteristics of stream applications to be processed by the set of many-core hardware processors to facilitate efficient task scheduling. Based on the nature of the processor architecture and the structure of streaming applications, a tuple-processing hardware route may be determined to route tuples to local cache memory (e.g., L1, L2, L3) for processing. Sequential stream operators may be placed on local processor cores to limit read and write operations between different processor cores (e.g., saving processor cycles). Single-job tenancy may be prioritized with respect to the set of many-core hardware processors to promote cache hits. Leveraging processor architecture information and stream application characteristics with respect to cache management may be associated with benefits such as stream application performance, cache hit rates, and processing efficiency.

Many-core hardware processors may be used to perform processing operations on streams of tuples in a stream computing environment. Aspects of the disclosure relate to the recognition that, in some situations, operating system schedulers may not take into account the nature of the streaming application or the processor architecture when scheduling tasks, resulting in challenges associated with cache hit rates (e.g., multiple jobs scheduled on one core may lead to cache misses) and local cache usage (e.g., jobs may be scheduled using slower caches, or spread out over multiple cores). Accordingly, aspects of the disclosure relate to determining a tuple-processing hardware route based on the nature of the processor architecture and the structure of the streaming application to facilitate efficient cache usage of a set of many-core hardware processors with respect to a stream computing environment. As such, cache hit rates, cache controller congestion, and job processing time may be benefited.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

A streams processing job has a directed graph of processing elements that send data tuples between the processing elements. The processing element operates on the incoming tuples, and produces output tuples. A processing element has an independent processing unit and runs on a host. The streams platform can be made up of a collection of hosts that are eligible for processing elements to be placed upon. When a job is submitted to the streams run-time, the platform scheduler processes the placement constraints on the processing elements, and then determines (the best) one of these candidates host for (all) the processing elements in that job, and schedules them for execution on the decided host.

Aspects of the disclosure relate to a system, method, and computer program product for cache management in a stream computing environment that uses a set of many-core hardware processors to process a stream of tuples by a plurality of processing elements which operate on the set of many-core hardware processors. The stream of tuples to be processed by the plurality of processing elements which operate on the set of many-core hardware processors may be received. A tuple-processing hardware-route on the set of many-core hardware processors may be determined based on a cache factor associated with the set of many-core hardware processors. The stream of tuples may be routed based on the tuple-processing hardware-route on the set of many-core hardware processors. The stream of tuples may be processed by the plurality of processing elements which operate on the set of many-core hardware processors.

In embodiments, a first cache utilization factor may be computed for a first cache of a first core of the set of many-core hardware processors, a second cache utilization factor may be computed for a second cache of the first core of the set of many core-hardware processors, a tuple-processing hardware-route to prioritize utilization of the first cache of the first core of the set of many core hardware processors may be resolved, and the first cache of the first core of the set of many-core hardware processors may be prioritized with respect to the second cache of the first core of the set of many-core hardware processors. In embodiments, it may be detected that the first and second caches of the first core of the set of many-core hardware processors are local caches to the first core of the set of many core processors. In embodiments, it may be detected that the first and second caches of the first core of the set of many-core hardware processors are local caches only to the first core of the set of many-core hardware processors. In embodiments, it may be ascertained that a second cache size of the second cache of the first core of the set of many-core hardware processors exceeds a first cache size of the first cache of the first core of the set of many-core hardware processors, and that a second cache access burden of the second cache of the first core of the set of many-core hardware processors exceeds a first cache access burden of the first cache of the first core of the set of many-core hardware processors. Altogether, aspects of the disclosure can have performance or efficiency benefits. Aspects may save resources such as bandwidth, disk, processing, or memory.

FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
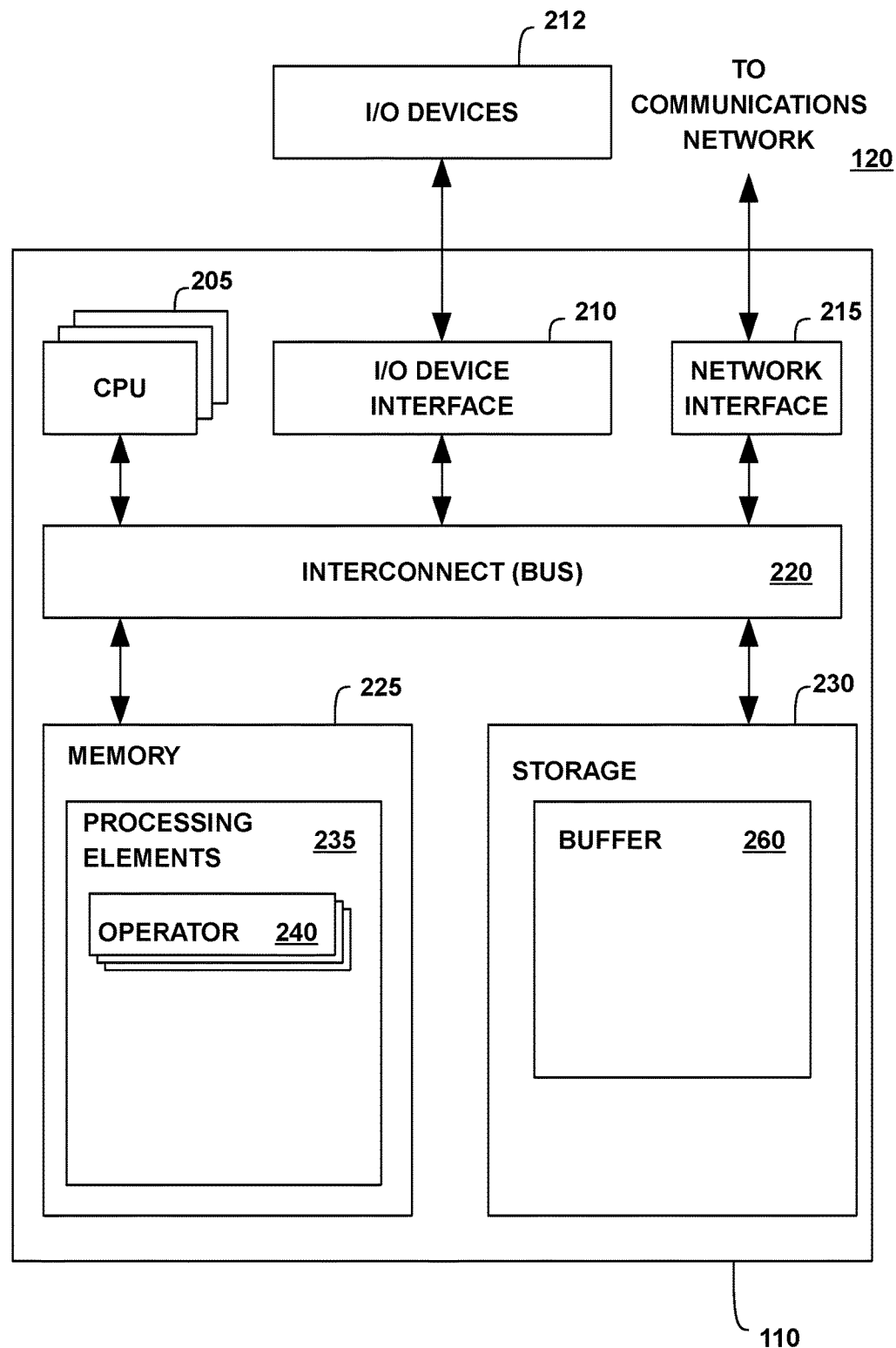
FIG. 2 illustrates a view of a compute node according to embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
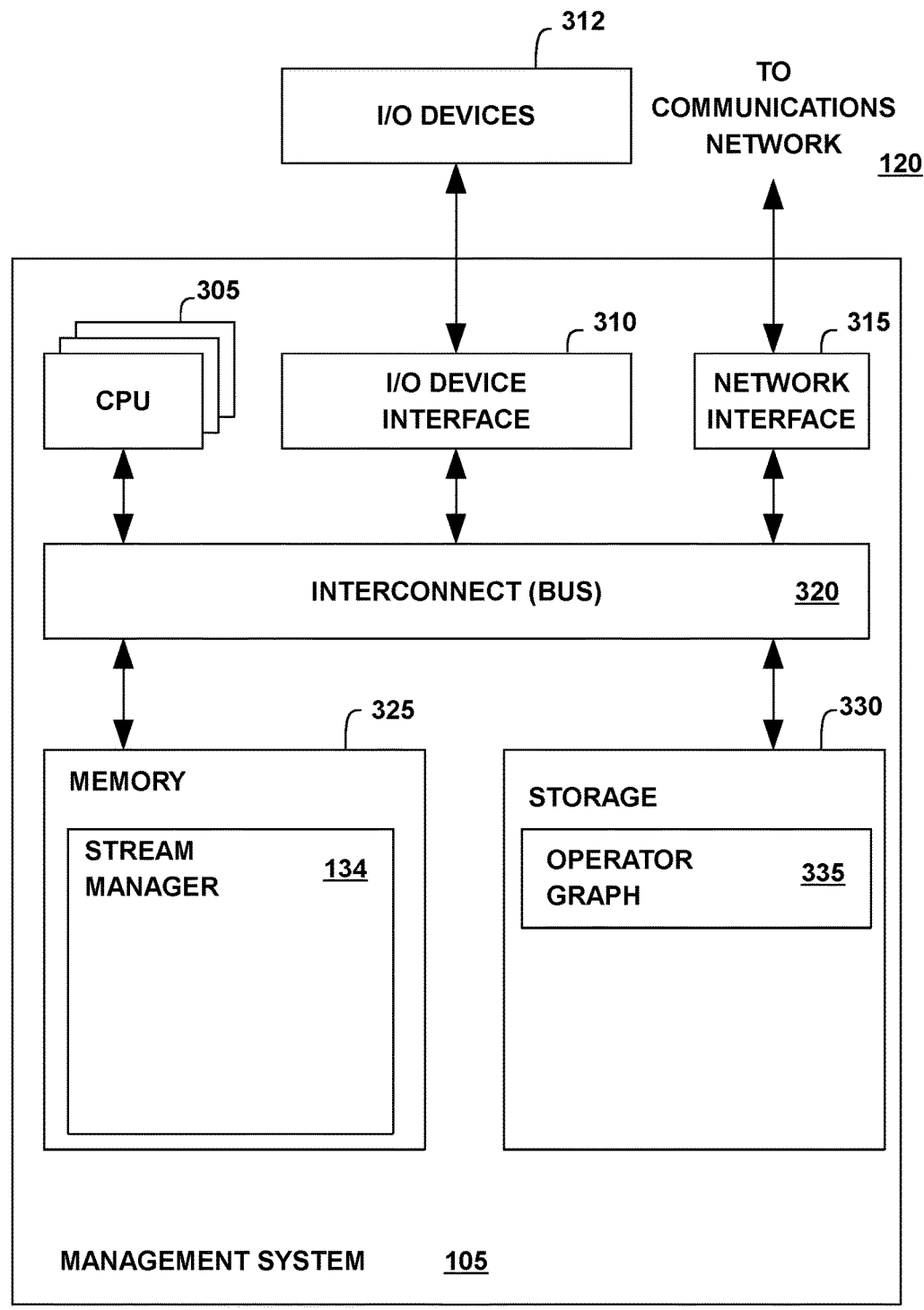
FIG. 3 illustrates a view of a management system according to embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 2) for processing or stored in memory 325 (e.g., completely in embodiments, partially in embodiments).

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
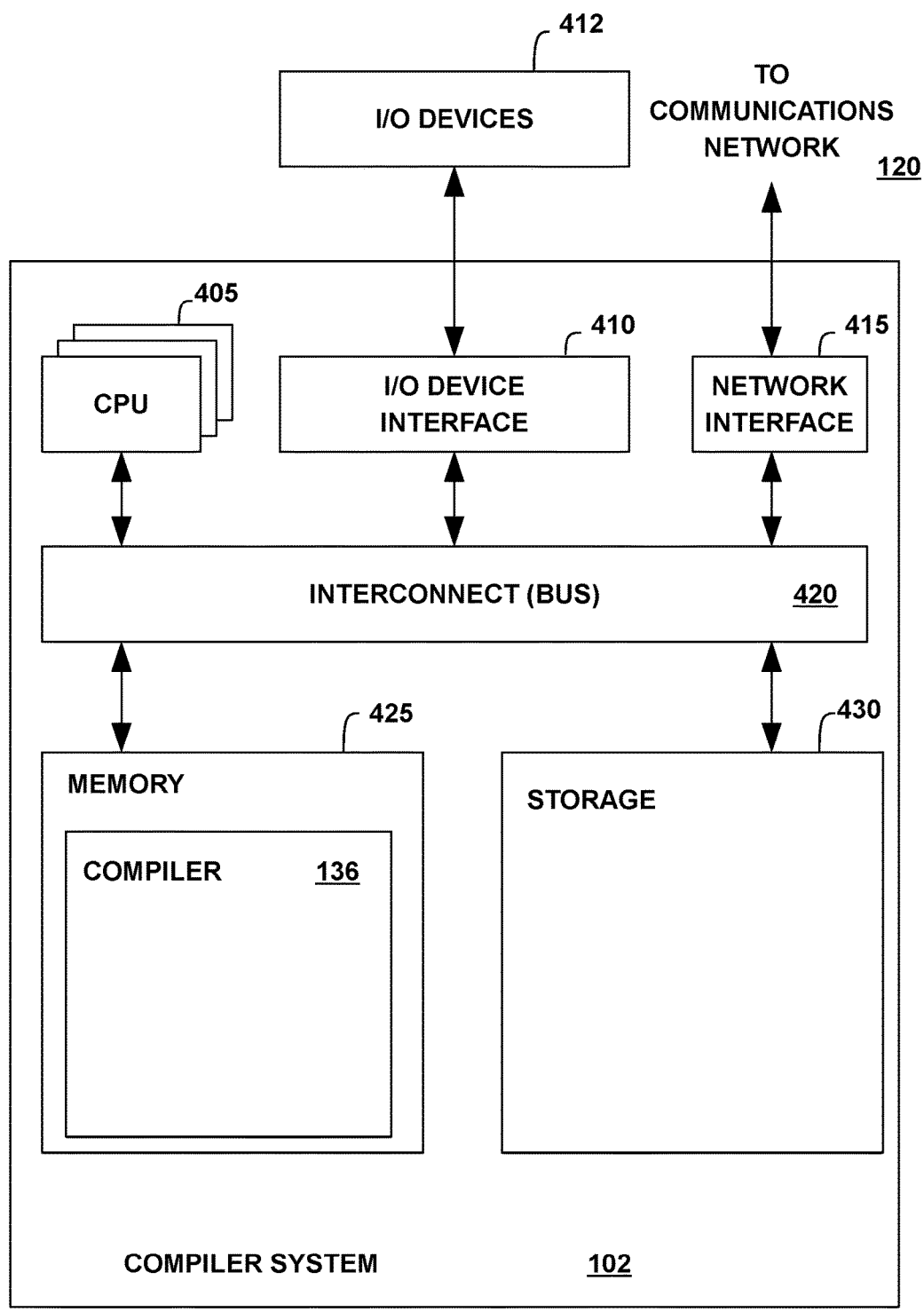
FIG. 4 illustrates a view of a compiler system according to embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The compiler system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In embodiments, a streams application bundle or streams application bundle file may be created. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 335.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute processes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
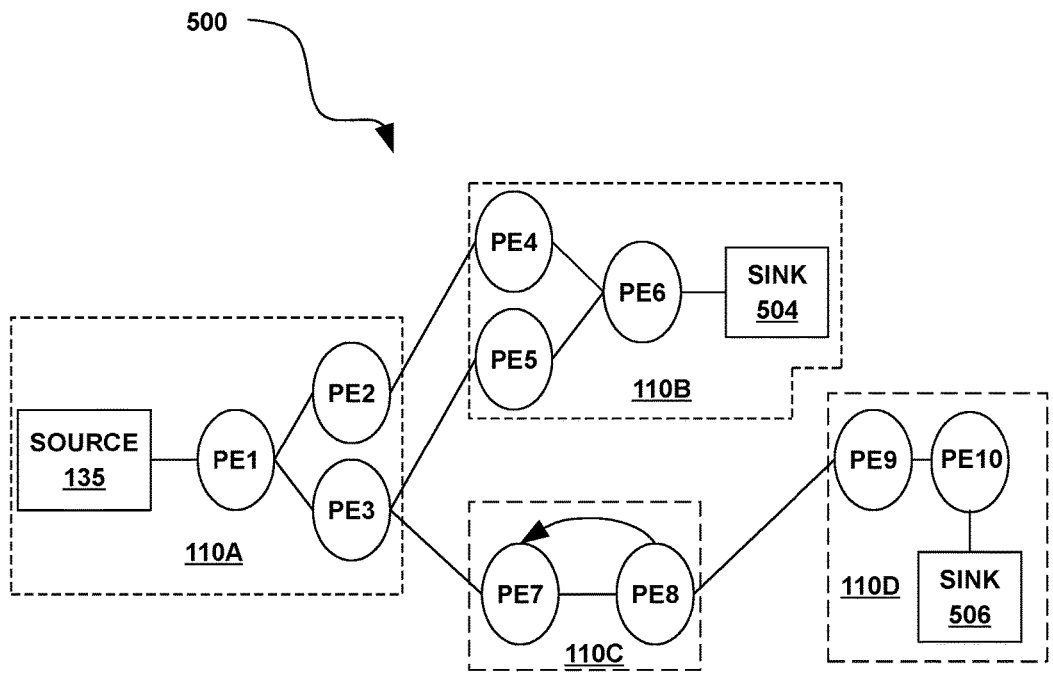
FIG. 5 illustrates an exemplary operator graph for a stream computing application according to embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
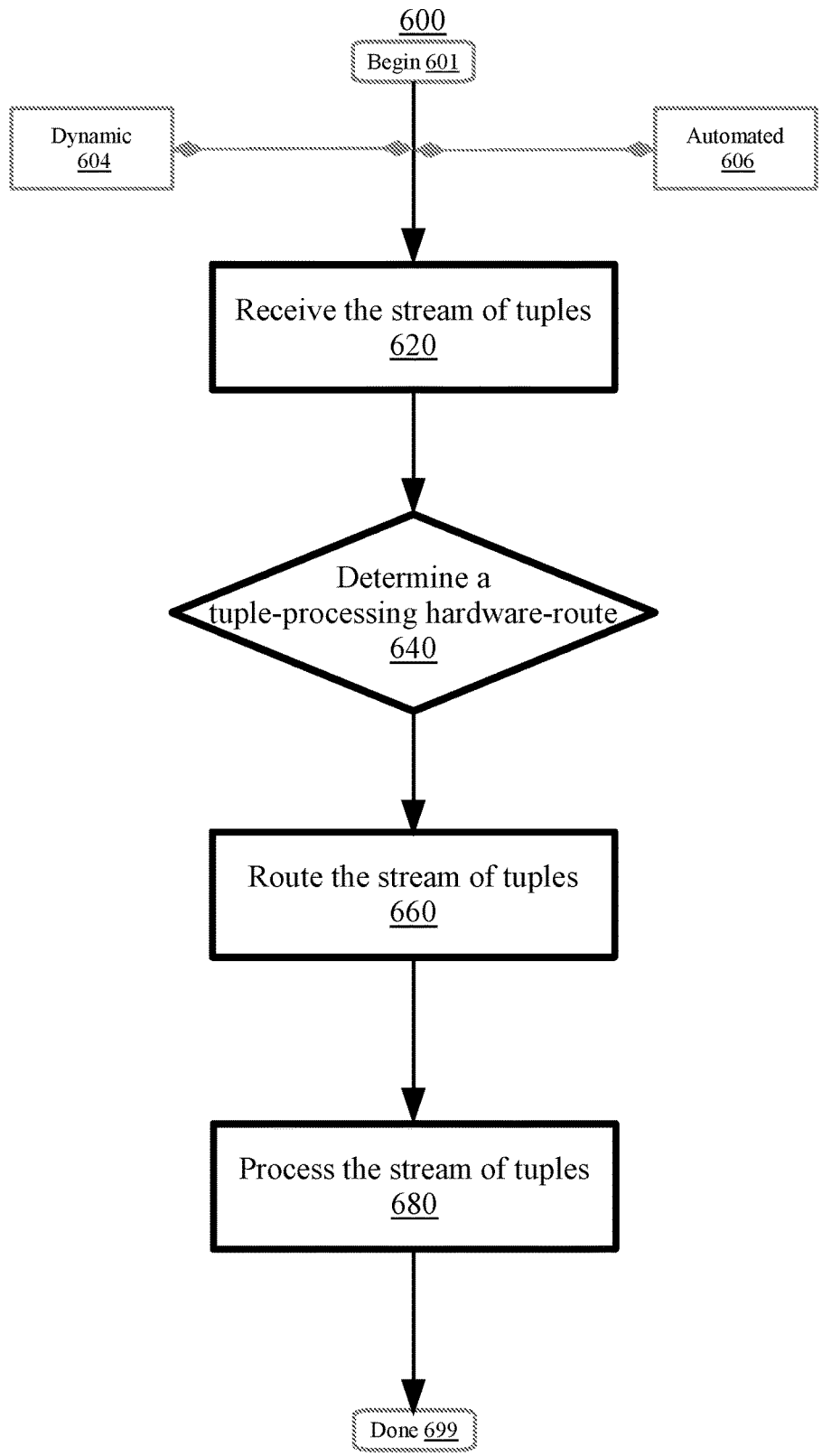
FIG. 6 is a flowchart illustrating a method for cache management in a stream computing environment that uses a set of many-core hardware processors to process a stream of tuples by a plurality of processing elements which operate on the set of many-core hardware processors, according to embodiments.

FIG. 6 is a flowchart illustrating a method 600 for cache management in a stream computing environment that uses a set of many-core hardware processors to process a stream of tuples by a plurality of processing elements which operate on the set of many-core hardware processors, according to embodiments. Aspects of method 600 relate to determining a tuple-processing hardware route based on a cache factor associated with the set of many-core hardware processors, and routing a stream of tuples based on the tuple-processing hardware route for utilizing the set of many-core hardware processors. The stream computing environment may include a platform for dynamically delivering and analyzing data in real-time. The stream computing environment may include an operator graph having a plurality of stream operators (e.g., filter operations, sort operators, join operators) and processing elements configured to perform processing operations on tuples flowing through the operator graph. In embodiments, a set of many-core hardware processors may be used to perform the processing operations on the tuples in the operator graph. The set of many-core hardware processors may include one or more physical processor units having a plurality (e.g., 10s, 100s, 1000s) of independent processor cores configured for parallel processing. In embodiments, one or more stream operators may be placed on one or more cores of one or more processors of the set of many-core hardware processors for execution of processing operations on streams of tuples. The method 600 may begin at block 601.

In embodiments, the receiving, the determining, the routing, the processing, and the other steps described herein may each be executed in a dynamic fashion at block 604. The steps described herein may be executed in a dynamic fashion to streamline cache management in the stream computing environment that uses the set of many-core hardware processors to process the stream of tuples by the plurality of processing elements which operate on the set of many-core hardware processors. For instance, the receiving, the determining, the routing, the processing, and the other steps described herein may occur in real-time, ongoing, or on-the-fly. As an example, one or more steps described herein may be performed on-the-fly (e.g., tuple-processing hardware routes may be determined dynamically based on processor architecture characteristics and the structure of stream applications so tuples may be routed for processing by the set of many-core hardware processors in real-time) in order to streamline (e.g., facilitate, promote, enhance) cache management in the stream computing environment. Other methods of performing the steps described herein are also possible.

In embodiments, the receiving, the determining, the routing, the processing, and the other steps described herein may each be executed in an automated fashion at block 606. The steps described herein may be executed in an automated fashion without user intervention. In embodiments, the receiving, the determining, the routing, the processing, and the other steps described herein may be carried out by an internal cache management module maintained in a persistent storage device of a locale computing device (e.g., network node). In embodiments, the receiving, the determining, the routing, the processing, and the other steps described herein may be carried out by an external cache management module hosted by a remote computing device or server (e.g., server accessible via a subscription, usage-based, or other service model). In this way, aspects of cache management in the stream computing environment may be performed using automated computing machinery without manual action. Other methods of performing the steps described herein are also possible.

At block 620, the stream of tuples may be received. The stream of tuples may be received to be processed by the plurality of processing elements which operate on the set of many-core hardware processors. Generally, receiving can include sensing, detecting, recognizing, identifying, collecting, or otherwise accepting delivery of the stream of tuples. The stream of tuples may include a collection of data units that define a sequence of attributes (e.g., named values). For instance, a tuple of [sym="Fe", no=26] may consist of two attributes "sym="Fe"" and "no=26." Batches of tuples may flow through an operator graph and undergo processing operations by one or more stream operators (e.g., processing elements to modify input tuples and produce output tuples). The set of stream operators may be placed (e.g., deployed) on one or more cores (e.g., independent processing unit for reading and executing program instructions) of one or more processors of the set of many-core hardware processors. An operating system schedule configured to manage one or more cores of the set of many-core hardware processors may schedule one or more processing operations for execution with respect to the stream of tuples by the set of stream operators. In embodiments, receiving may include detecting an incoming set of input tuples with respect to a particular core or cores of the set of many-core hardware processors. For instance, receiving may include loading the stream of tuples into a tuple buffer (e.g., first-in-first-out queue) of a particular stream operator for subsequent routing and processing. Other methods of receiving the stream of tuples to be processed by the plurality of processing elements on the set of many-core hardware processors are also possible.

At block 640, a tuple-processing hardware-route on the set of many-core hardware processors may be determined. The determining may be performed based on a cache factor associated with the set of many-core hardware processors. Generally, determining can include formulating, resolving, computing, calculating, identifying, or otherwise ascertaining the tuple-processing hardware route based on the cache factor associated with the set of many-core hardware processors. The tuple-processing hardware-route may include a route, course, branch, or path taken by the stream of tuples as they are processed by the processing elements of the set of many-core hardware processors. In embodiments, the tuple-processing hardware route may indicate the execution path taken by the stream of tuples as they flow through the operator graph of the stream computing environment (e.g., which branches of the operator graph the tuples travel, which stream operators they are processed by). In embodiments, the tuple-processing hardware route may indicate the hardware components configured to process the stream of tuples. For instance, the tuple-processing hardware route may indicate the hardware processors, processor cores, and individual cache units used to process the stream of tuples. As an example, the tuple-processing hardware route may indicate that a stream of tuples is to be processed by a "join" operator using an L1 cache of a third processor core on a first hardware processor followed by a "filter" operator using an L2 cache of a second processor core on a second hardware processor. In embodiments, the tuple-processing hardware-route may be determined based on a cache factor associated with the set of many-core hardware processors. The cache factor may include an attribute, condition, property, criterion, or other parameter that characterizes one or more caches of one or more cores of at least one hardware processor of the set of many-core hardware processors. The cache factor may characterize the nature of a portion of cache memory with respect to the processor architecture of the set of many-core hardware processors, or the suitability of a particular cache for processing/storage of a set of tuples of the stream of tuples. As examples, the cache factor may include the speed of a cache (e.g., 3 processor cycles, 12 processor cycles), the size of a cache (e.g., 64 kilobytes, 2 megabytes), the utilization of a cache (e.g., number of jobs that use the cache), the location of a cache (e.g., which core of which processor), physical distance from another core (e.g., 5 millimeters), a cache access burden (e.g., operational cost of using the cache) or the like. In embodiments, determining the tuple-processing hardware route may include evaluating the set of many-core hardware processors with respect to the stream of tuples to ascertain a sequence of cache units (e.g., of one or more cores) that define a path for processing the stream of tuples that achieves a suitability threshold (e.g., total processing time below a threshold, efficiency above a certain level). As an example, determining may include examining the cache factor (e.g., location, speed, size, availability) for cache units of a first processor and a second processor, and calculating that a candidate tuple-processing hardware route of an L2 cache of a first processor core of the first processor, an L1 cache of a fifth processor core of the second processor, and an L1 cache of an eleventh processor core of the second processor achieves a total number of processor cycles of 31 cycles, achieving a target processor cycle threshold of less than 45 cycles. Accordingly, the candidate tuple-processing hardware route may be determined as the tuple-processing hardware route to process the stream of tuples. Other methods of determining the tuple-processing hardware-route based on the cache factor associated with the set of many-core hardware processors are also possible.

At block 660, the stream of tuples may be routed. The routing may be performed based on the tuple-processing hardware-route on the set of many-core hardware processors. Generally, routing can include conveying, relaying, transferring, conducting, sending, or otherwise directing the stream of tuples based on the tuple-processing hardware-route on the set of many-core hardware processors. In embodiments, routing the stream of tuples may include directing the stream of tuples to the cache units of the processor cores indicated by the tuple-processing hardware route. For instance, in embodiments, routing may include identifying a network path address for each hardware component (e.g., cache) designated by the tuple-processing hardware-route, ascertaining one or more communication buses that may be used to transfer the stream of tuples between each respective component of the tuple-processing hardware-route, and subsequently transmitting the stream of tuples to each hardware component of the tuple-processing hardware-route using the identified communication buses and network path addresses. As described herein, the stream of tuples may undergo one or more processing operations by the processing elements deployed to each core specified by the tuple-processing hardware-route. As an example, consider that a tuple-processing hardware-route for a set of tuples is determined that designates that the set of tuples be processed at an L1 cache of a fourth core of a first processor, an L2 cache of the fourth core of the first processor, an L2 cache of a fifth core of the first processor, and an L1 cache of a second core of a second processor. Accordingly, the stream of tuples may be transferred from the L1 cache of the fourth core of the first processor to the L2 cache of the fourth core of the first processor, the L2 cache of the fifth core of the first processor, and the L1 cache of the second core of the second processor using corresponding network path addresses and communication buses for each cache unit of the tuple-processing hardware-route. Other methods of routing the stream of tuples based on the tuple-processing hardware-route are also possible.

At block 680, the stream of tuples may be processed. The stream of tuples may be processed by the plurality of processing elements which operate on the set of many-core hardware processors. The processing may be performed utilizing the set of many-core hardware processors. Generally, processing can include analyzing, evaluating, altering, investigating, examining, modifying, or otherwise managing the stream of tuples. Processing the stream of tuples may include using one or more processor elements placed on the set of many-core hardware processors to perform a series of processing operations on the stream of tuples to convert input tuples to output tuples. In embodiments, each core of the set of many-core hardware processors that is defined as part of the tuple-processing hardware-route may be configured to perform one or more processing operations on the stream of tuples. For instance, in embodiments, in response to detecting that the stream of tuples has been written to a cache unit (e.g., L1 cache) of a particular core, the core may read the stream of tuples from the cache unit, execute one or more scheduled processing operations (e.g., joining, sorting, filtering), and rewrite the modified stream of tuples to the cache unit to await operation of a subsequent processing operation by the same core or transfer to another core defined by the tuple-processing hardware-route. As an example, consider that a tuple-processing hardware-route defines that a stream of tuples be processed by a filter operation at an L2 cache of a third core of a first processor. Accordingly, the stream of tuples may be written to the L2 cache of the third core of the first processor, be read from the L2 cache, processed by the filter operation of the third core to remove tuples associated with a timestamp before a threshold point in time, and written back to the L2 cache. Other methods of processing the stream of tuples by the plurality of processing elements which operate on the set of many-core hardware processors are also possible.

Consider the following example. A stream of tuples related to radio signals may be received (e.g., stored in a buffer or queue to await processing) by a set of many-core hardware processors including a first processor and a second processor that each have four independent cores. A filter operator may be placed on the first processor and a sort operator may be placed on the second processor. The stream of tuples may be formatted in individual tuple batches each having a file size of 1 megabyte. As described herein, a tuple-processing hardware route may be determined based on a cache factor associated with the set of many-core hardware processors. The cache factor may indicate that the size of the L1 cache for each core of both the first and second processors is 64 kilobytes, and that the L2 cache for each core of both the first and second processors is 2 megabytes. In embodiments, the cache factor may also indicate that the first, third, and fourth cores of the first processor are operating at 80% capacity under current workloads, and that the second and third cores of the second processor are operating at 91% under current workloads (e.g., such that placement of the stream of tuples on those cores may result in latency or high cache-miss rates). Accordingly, a tuple-processing hardware-route may be determined for the stream of tuples based on the cache factor. As an example, a tuple-processing hardware-route of the L2 cache on a second core of the first processor (e.g., the 1 megabyte tuple batches may be too big for L1 caches prior to filtering), the L1 cache of the first core of the second processor (e.g., the tuple batches may be an appropriate size for the L1 cache after filtering), and the L2 cache of the first core of the second processor may be determined (e.g., the L2 cache may be used as a back-up in case the tuple batches are too large for the L1 cache). As such, the stream of tuples may be routed from the L2 cache of the second core of the first processor to the L1 cache of the first core of the second processor and the L2 cache of the first core of the second processor as defined by the tuple-processing hardware-route. In embodiments, the stream of tuples may be processed by the processing elements/stream operators placed on each core of the processors included in the tuple-processing hardware-route. For instance, tuple batches of the stream of tuples may be written to the L2 cache of the second core of the first processor, read from the L2 cache, filtered by the filter operator (e.g., to remove radio wave data outside a threshold frequency), written back to the L2 cache of the second core, routed and written to either the L1 cache or the L2 cache of the first core of the second processor (e.g., based on the size of the filtered tuples), read from the L1 or L2 cache, sorted by the sort operator (e.g., sorted by spectral power distribution range) and written back to the corresponding cache of the second processor. Other methods of cache management in a stream computing environment using a set of many-core hardware processors are also possible.

Method 600 concludes at block 699. Aspects of method 600 may provide performance or efficiency benefits related to cache management. For instance, determining a tuple-processing hardware route based on a cache factor associated with the set of many-core hardware processors and routing a stream of tuples based on the tuple-processing hardware route may promote cache hits and facilitate low-latency processing of tuples. Altogether, leveraging processor architecture information and stream application characteristics with respect to cache management may be associated with benefits such as stream application performance, cache hit rates, and processing efficiency. Aspects may save resources such as bandwidth, disk, processing, or memory.

Figure 7:
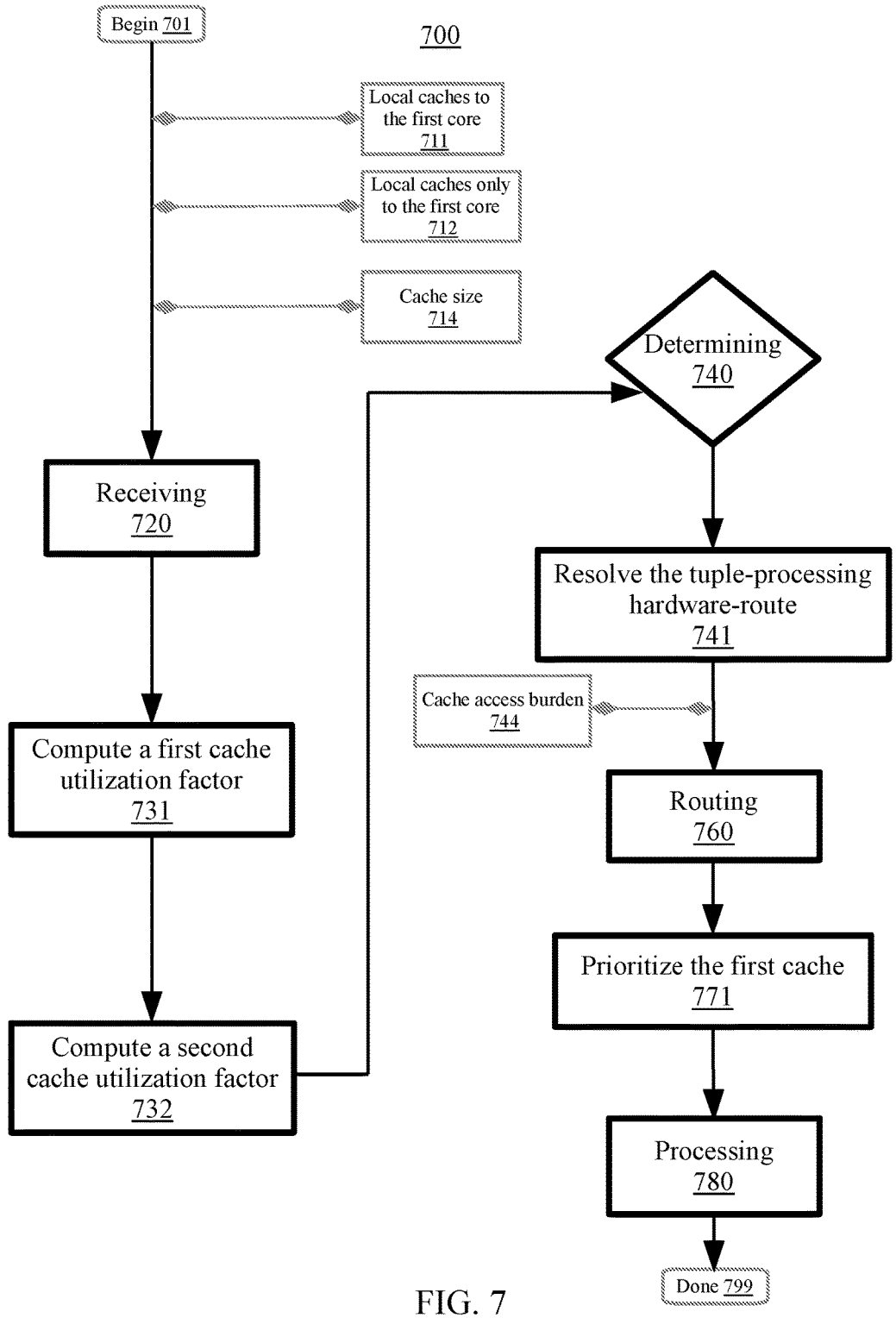
FIG. 7 is a flowchart illustrating a method for cache management in a stream computing environment that uses a set of many-core hardware processors to process a stream of tuples by a plurality of processing elements which operate on the set of many-core hardware processors, according to embodiments.

FIG. 7 is a flowchart illustrating a method 700 for cache management in a stream computing environment that uses a set of many-core hardware processors to process a stream of tuples by a plurality of processing elements which operate on the set of many-core hardware processors, according to embodiments. Aspects of method 700 method 700 relate to resolving the tuple-processing hardware route to prioritize utilization of a first cache of a first core of the set of many core hardware processors based on computation of utilization factors for the first cache of the first core and the second cache of the first core. Aspects of method 700 may be similar or the same as aspects of method 600, and aspects may be utilized interchangeably. The method 700 may begin at block 701.

In embodiments, it may be detected that the first and second caches of the first core of the set of many-core hardware processors are local caches to the first core of the set of many-core hardware processors at block 711. The detecting may be performed for cache management in the stream computing environment. Generally, detecting can include sensing, discovering, recognizing, resolving, identifying, or otherwise ascertaining that the first and second caches of the first core of the set of many-core hardware processors are local caches to the first core of the set of many-core hardware processors. In embodiments, detecting may include examining the physical processor architecture of the set of many-core hardware processors, and identifying that the first and second caches are located on the same physical processor (e.g., same integrated circuit) as the first core. As an example, detecting may include determining that an L1 cache (e.g., first cache) and an L2 cache (e.g., second cache) located on the same physical processor are coupled with the first core. In certain embodiments, detecting may include identifying that an L3 cache is communicatively connected to the first core using a local system bus (e.g., and thus may be considered local to the first core). In embodiments, it may be detected (e.g., sensed, discovered, recognized, resolved, identified, ascertained) that the first and second caches of the first core of the set of many-core hardware processors are local caches only to the first core of the set of many-core hardware processors at block 712. In embodiments, detecting may include examining the physical processor architecture of the set of many-core hardware processors, and identifying that the first and second caches are not communicatively connected to any other cores on the same physical processor, such that the first and second caches are only locally accessible to the first core. As an example, detecting may include determining that an L1 cache (e.g., first cache) and an L2 cache (e.g., second cache) do not maintain any local system bus connections to other cores on the same processor. Other methods of detecting that the first and second caches of the first core are local caches to the first core, and detecting that the first and second caches of the first core are local caches only to the first core are also possible.

In embodiments, it may be ascertained that a second cache size of the second cache of the first core of the set of many-core hardware processors exceeds a first cache size of the first cache of the first core of the set of many-core hardware processors at block 714. The ascertaining may be performed for cache management in the stream computing environment. Generally, ascertaining can include formulating, resolving, computing, calculating, identifying, or otherwise determining that the second cache size of the second cache of the first core exceeds the first cache size of the first cache of the first core. The first and second cache sizes may indicate the amount of data storage space available to the first and second caches, respectively. In embodiments, ascertaining may include using a system hardware diagnostic to examine the first cache size with respect to the second cache size, and determining that the magnitude of the data storage space allocated for use by the second cache is greater than the magnitude of the data storage space allocated for use by the first cache. As an example, an L1 cache (e.g., first cache) of the first core may be compared with an L2 cache (e.g., second cache) of the first core, and it may be ascertained that the L2 cache has a size of "2 megabytes," which exceeds the L1 cache size of "64 kilobytes." As another example, an L2 cache (e.g., first cache) of the first core may be compared with an L3 cache (e.g., second cache), and it may be ascertained that the L3 cache has a size of "16 megabytes," which exceeds the L2 cache size of "2 megabytes." Other methods of ascertaining that the second cache size of the second cache of the first core exceeds the first cache size of the first cache of the first core are also possible.

At block 720, the stream of tuples may be received. The stream of tuples may be received to be processed by the plurality of processing elements which operate on the set of many-core hardware processors. Generally, receiving can include sensing, detecting, recognizing, identifying, collecting, or otherwise accepting delivery of the stream of tuples. In embodiments, receiving may include detecting an incoming set of input tuples with respect to a particular core or cores of the set of many-core hardware processors. Other methods of receiving the stream of tuples to be processed by the plurality of processing elements which operate on the set of many-core hardware processors are also possible.

At block 731, a first cache utilization factor may be computed. The first cache utilization factor may be computed for a first cache of a first core of the set of many-core hardware processors. The computing may be performed for cache management in the stream computing environment. Generally, computing can include formulating, calculating, ascertaining, measuring, estimating, or otherwise determining the first cache utilization factor for the first cache of the first core of the set of many-core hardware processors. The first cache utilization factor may include an attribute, condition, property, criterion, or other parameter that characterizes the current or expected usage, performance, or availability of the first cache of the first core of the set of many-core hardware processors. For instance, the first cache utilization factor may indicate the accessibility (e.g., access burden) of the first cache with respect to the stream of tuples. In embodiments, the first cache utilization factor may be quantitatively expressed as an integer between 0 and 100, where greater values indicate greater suitability (e.g., easier access, faster expected processing) for processing the stream of tuples. In embodiments, computing the first cache utilization factor may include calculating an expected number of CPU cycles that would be necessary to process the stream of tuples using the first cache of the first core, and determining the first cache utilization factor for the first cache of the first core based on the expected number of CPU cycles (e.g., where higher expected numbers of CPU cycles correlate with lower cache utilization factors). As an example, consider that the first cache is an L1 cache. Accordingly, computing may include evaluating the L1 cache and ascertaining that processing data using the L1 cache may require an expected number of CPU cycles of "12" (e.g., 3 cycles to write data to the cache, 3 cycles to read the data from the cache, 3 cycles to process the data, 3 cycles to rewrite the modified data back to the L1 cache). Based on the expected number of CPU cycles of "12," a first cache utilization factor of "84" may be computed for the first cache of the first core. Other methods of computing the first cache utilization factor for the first cache of the first core of the set of many-core hardware processors are also possible.

At block 732, a second cache utilization factor may be computed. The second cache utilization factor may be computed for a second cache of the first core of the set of many-core hardware processors. The computing may be performed for cache management in the stream computing environment. Generally, computing can include formulating, calculating, ascertaining, measuring, estimating, or otherwise determining the second cache utilization factor for the second cache of the first core of the set of many-core hardware processors. The second cache utilization factor many include an attribute, condition, property, criterion, or other parameter that characterizes the current or expected usage, performance, or availability of the second cache of the first core of the set of many-core hardware processors. For instance, the second cache utilization factor may indicate the accessibility (e.g., access burden) of the second cache with respect to the stream of tuples (e.g., quantitatively expressed as an integer between 0 and 100). In embodiments, computing the second cache utilization factor may include calculating an expected number of CPU cycles that would be necessary to process the stream of tuples using the second cache of the first core, and determining the second cache utilization factor for the second cache of the first core based on the expected number of CPU cycles (e.g., where higher expected numbers of CPU cycles correlate with lower cache utilization factors). As an example, consider that the second cache is an L2 cache. Accordingly, computing may include evaluating the L2 cache and ascertaining that processing data using the L2 cache may require an expected number of CPU cycles of "24" (e.g., 7 cycles to write data to the cache, 7 cycles to read the data from the cache, 3 cycles to process the data, 7 cycles to rewrite the modified data back to the L2 cache). Based on the expected number of CPU cycles of "24," a first cache utilization factor of "59" may be computed for the second cache of the first core. Other methods of computing the second cache utilization factor for the second cache of the first core of the set of many-core hardware processors are also possible.

At block 740, a tuple-processing hardware-route on the set of many-core hardware processors may be determined. The determining may be performed based on a cache factor associated with the set of many-core hardware processors. Generally, determining can include formulating, resolving, computing, calculating, identifying, or otherwise ascertaining the tuple-processing hardware route based on the cache factor associated with the set of many-core hardware processors. In embodiments, determining the tuple-processing hardware route may include evaluating the set of many-core hardware processors with respect to the stream of tuples to ascertain a sequence of cache units (e.g., of one or more cores) that define a path for processing the stream of tuples that achieves a suitability threshold (e.g., total processing time below a threshold, efficiency above a certain level). Other methods of determining the tuple-processing hardware route on the set of many-core hardware processors are also possible.

At block 741, the tuple-processing hardware-route may be resolved. The resolving may be performed to prioritize utilization of the first cache of the first core of the set of many-core hardware processors with respect to the second cache of the first core of the set of many-core hardware processors. The resolving may be performed by comparing the first cache utilization factor for the first cache of the first core of the set of many-core hardware processors with the second cache utilization factor for the second cache of the first core of the set of many-core hardware processors. Generally, resolving can include formulating, ascertaining, computing, calculating, identifying, or otherwise determining the tuple-processing hardware route to prioritize utilization of the first cache of the first core with respect to the second cache of the first core. In embodiments, resolving can include comparing the first cache utilization factor for the first cache of the first core with respect to the second cache utilization factor for the second cache of the first core, and selecting the cache having the greater cache utilization factor (e.g., lower expected number of CPU cycles) for use to process the stream of tuples. Consider the example described herein in which a first cache of an L1 cache and a second cache of an L2 cache are located on the first core (e.g., locally placed on the same core of the same processor). As described herein, the first cache utilization factor of "84" for the L1 cache (e.g., first cache) of the first core may be compared with the second cache utilization factor of "59" for the L2 cache (e.g., second cache) of the first core, and the first cache of the first core may be ascertained for use to facilitate processing of the stream of tuples (e.g., the L1 cache is faster than the L2 cache, requiring half the number of CPU cycles to process the stream of tuples). Accordingly, a tuple-processing hardware-route to transfer the stream of tuples to the L1 cache of the first core for processing may be determined. Other methods of resolving the tuple-processing hardware-route to prioritize utilization of the first cache of the first core with respect to the first cache of the first core are also possible.

In embodiments, it may be ascertained that a second cache access burden of the second cache of the first core of the set of many-core hardware processors exceeds a first cache access burden of the first cache of the first core of the set of many-core hardware processors at block 744. The ascertaining may be performed as part of cache management in the stream computing environment. Generally, ascertaining can include formulating, resolving, computing, calculating, identifying, or otherwise determining that the second cache access burden of the second cache of the first core exceeds the first cache access burden of the first cache of the first core. The first and second cache access burdens may indicate the cost or expense (e.g., in terms of time or system resources) for utilizing the first and second caches, respectively. In embodiments, the first and second cache access burdens may be expressed using a number of CPU clock cycles that are necessary to perform read or write operations using the first and second caches. In embodiments, ascertaining that the second cache access burden of the second cache of the first core exceeds the first cache access burden of the first cache of the first core may include performing a test operation to read and write a set of data to both the second cache of the first core and the first cache of the first core, and measuring the number of CPU clock cycles that are necessary to complete the operation. As an example, in embodiments, a test operation may be performed with respect to an L2 cache (e.g., second cache) of the first core and the L1 cache (e.g., first cache) of the first core, and it may be calculated that it takes 7 CPU clock cycles to write data to the L2 cache of the first core, and 3 CPU clock cycles to write data to the L1 cache of the first core. Accordingly, based on the test operation, it may be determined that the second cache access burden of the second cache of the first core is greater than the first cache access burden of the first cache of the first core. Other methods of ascertaining that the second cache access burden of the second cache of the first core exceeds the first cache access burden of the first cache of the first core are also possible.

At block 760, the stream of tuples may be routed. The routing may be performed based on the tuple-processing hardware-route on the set of many-core hardware processors. Generally, routing can include conveying, relaying, transferring, conducting, sending, or otherwise directing the stream of tuples based on the tuple-processing hardware-route on the set of many-core hardware processors. In embodiments, routing the stream of tuples may include identifying a network path address for each hardware component (e.g., cache) designated by the tuple-processing hardware-route, ascertaining one or more communication buses that may be used to transfer the stream of tuples between each respective component of the tuple-processing hardware-route, and subsequently transmitting the stream of tuples to each hardware component of the tuple-processing hardware-route using the identified communication buses and network path addresses. Other methods of routing the stream of tuples based on the tuple-processing hardware-route are also possible.

At block 771, the first cache of the first core of the set of many-core hardware processors may be prioritized. The first cache may be prioritized with respect to the second cache of the first core of the set of many-core hardware processors. The prioritizing may pertain to processing the stream of tuples utilizing the set of many-core hardware processors. Generally, prioritizing can include arranging, ordering, ranking, organizing, or otherwise giving preference to the first cache of the first core to process the stream of tuples. In embodiments, prioritizing may include generating a cache utilization hierarchy that defines the order of priority or preference in which the caches of the set of many-core hardware processors should be used to process the stream of tuples. Accordingly, the first cache of the first core may be assigned a position in the cache utilization hierarchy that indicates greater priority or preference than the second cache of the first core. Again consider the example described herein in which a first cache of an L1 cache and a second cache of an L2 cache are located on the first core (e.g., locally placed on the same core of the same processor). As described herein, in response to resolving the tuple-processing hardware-route to prioritize utilization of the first cache of the first core with respect to the second cache of the first core (e.g., as the first cache had the greater cache utilization factor) a cache utilization hierarchy may be generated in which the L1 cache of the first core is assigned a priority level of "1" and the L2 cache of the first core is assigned a priority level of "2" (e.g., where lower priority levels indicate greater usage preference). Accordingly, the stream of tuples may be processed based on the cache utilization hierarchy such that the L1 cache of the first core is given preference for tuple processing (e.g., and the L2 cache of the first core is used as a backup). Other methods of prioritizing the first cache of the first core with respect to the second cache of the first core are also possible.

At block 780, the stream of tuples may be processed. The stream of tuples may be processed by the plurality of processing elements which operate on the set of many-core hardware processors. The processing may be performed utilizing the set of many-core hardware processors. Generally, processing can include analyzing, evaluating, altering, investigating, examining, modifying, or otherwise managing the stream of tuples. Processing the stream of tuples may include using one or more processor elements placed on the set of many-core hardware processors to perform a series of processing operations on the stream of tuples to convert input tuples to output tuples. Other methods of processing the stream of tuples by the plurality of processing elements which operate on the set of many-core hardware processors are also possible.

Method 700 concludes at block 799. Aspects of method 700 may provide performance or efficiency benefits related to cache management. Altogether, leveraging processor architecture information and stream application characteristics with respect to cache management may be associated with benefits such as stream application performance, cache hit rates, and processing efficiency. Aspects may save resources such as bandwidth, disk, processing, or memory.

Figure 8:
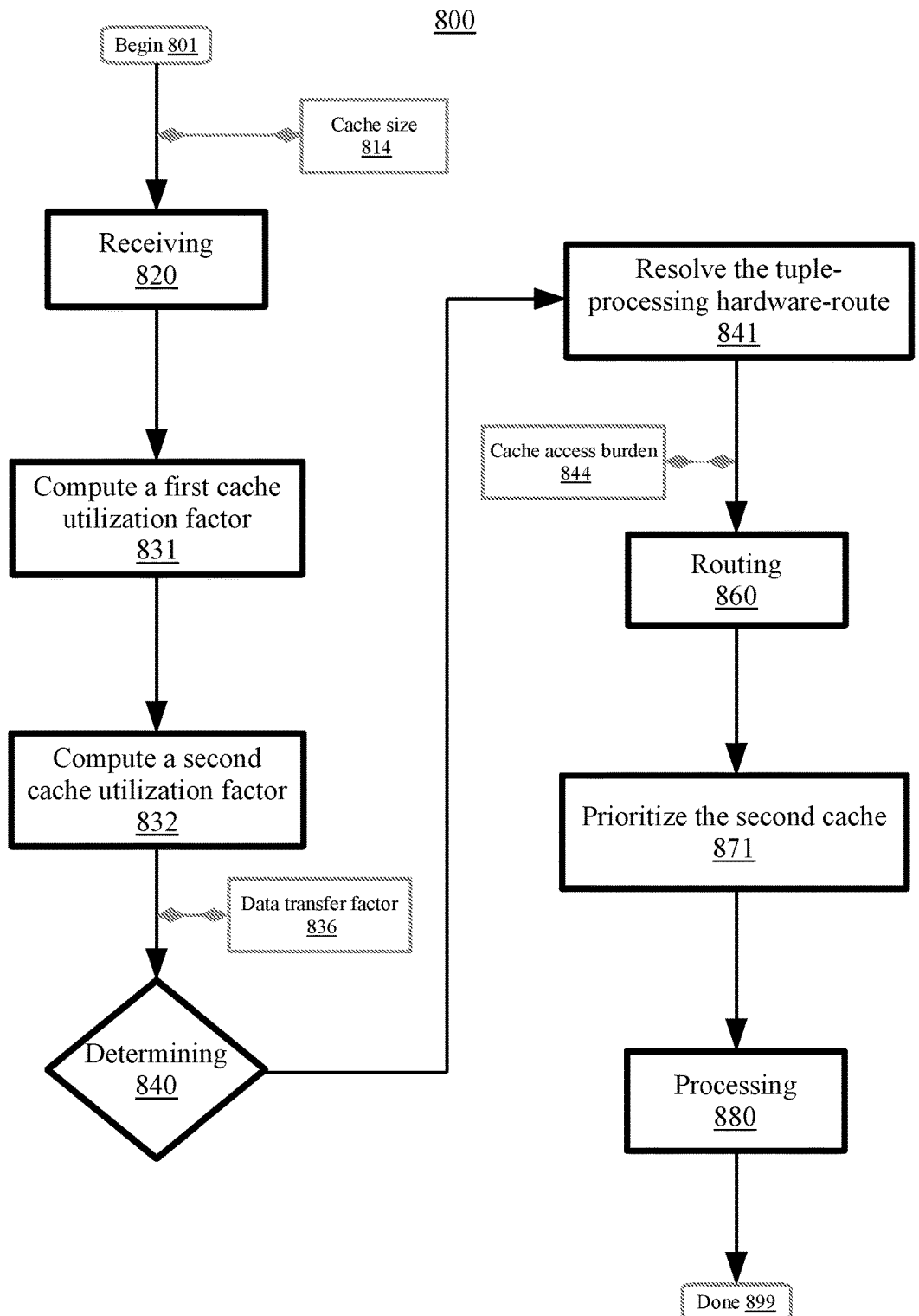
FIG. 8 is a flowchart illustrating a method for cache management in a stream computing environment that uses a set of many-core hardware processors to process a stream of tuples by a plurality of processing elements which operate on the set of many-core hardware processors, according to embodiments.

FIG. 8 is a flowchart illustrating a method 800 for cache management in a stream computing environment that uses a set of many-core hardware processors to process a stream of tuples by a plurality of processing elements which operate on the set of many-core hardware processors, according to embodiments. Aspects of method 800 relate to resolving the tuple-processing hardware route to prioritize utilization of a second cache of a second core of the set of many core hardware processors based on computation of utilization factors for the first cache of the first core and the second cache of the second core. Aspects of method 800 may be similar or the same as aspects of method 600/700, and aspects may be utilized interchangeably. The method 800 may begin at block 801.

In embodiments, it may be ascertained that a second cache size of the second cache of the second core of the set of many-core hardware processors exceeds a first cache size of the first cache of the first core of the set of many-core hardware processors at block 814. Generally, ascertaining can include formulating, resolving, computing, calculating, identifying, or otherwise determining that the second cache size of the second cache of the second core exceeds the first cache size of the first cache of the first core. The first and second cache sizes may indicate the amount of data storage space available to the first and second caches, respectively. In embodiments, ascertaining may include using a system hardware diagnostic to examine the first cache size with respect to the second cache size, and determining that the magnitude of the data storage space allocated for use by the second cache is greater than the magnitude of the data storage space allocated for use by the first cache. As an example, in embodiments, an L1 cache (e.g., first cache) of the first core may be compared with an L2 cache (e.g., second cache) of the second core, and it may be ascertained that the L2 cache has a size of "3 megabytes," which exceeds the L1 cache size of "32 kilobytes." As another example, an L2 cache (e.g., first cache) of the second core may be compared with an L3 cache (e.g., second cache), and it may be ascertained that the L3 cache has a size of "32 megabytes," which exceeds the L2 cache size of "3 megabytes." Other methods of ascertaining that the second cache size of the second cache of the second core exceeds the first cache size of the first cache of the first core are also possible.

At block 820, the stream of tuples may be received. The stream of tuples may be received to be processed by the plurality of processing elements which operate on the set of many-core hardware processors. Generally, receiving can include sensing, detecting, recognizing, identifying, collecting, or otherwise accepting delivery of the stream of tuples. In embodiments, receiving may include detecting an incoming set of input tuples with respect to a particular core or cores of the set of many-core hardware processors. Other methods of receiving the stream of tuples to be processed by the plurality of processing elements which operate on the set of many-core hardware processors are also possible.

At block 831, a first cache utilization factor for a first cache of a first core of the set of many-core hardware processors may be computed. The computing may be performed for cache management in the stream computing environment. Generally, computing can include formulating, calculating, ascertaining, measuring, estimating, or otherwise determining the first cache utilization factor for the first cache of the first core of the set of many-core hardware processors. The first cache utilization factor may include an attribute, condition, property, criterion, or other parameter that characterizes the current or expected usage, performance, or availability of the first cache of the first core of the set of many-core hardware processors. For instance, the first cache utilization factor may indicate the accessibility (e.g., access burden) of the first cache with respect to the stream of tuples. In embodiments, the first cache utilization factor may be quantitatively expressed as an integer between 0 and 100, where greater values indicate greater suitability (e.g., easier access, faster expected processing) for processing the stream of tuples. In embodiments, computing the first cache utilization factor may include calculating an expected number of CPU cycles that would be necessary to process the stream of tuples using the first cache of the first core, and determining the first cache utilization factor for the first cache of the first core based on the expected number of CPU cycles (e.g., where higher expected numbers of CPU cycles correlate with lower cache utilization factors). As an example, consider a situation in which a stream of tuples is maintained in a first cache (e.g., L1 cache) of a second core of the set of many-core hardware processors (e.g., such that the stream of tuples would need to be transferred from the second core to the first core for processing). Computing may include taking into account the physical distance between the first cache of the second core and the first cache of the first core, the time to transfer the tuples, expected time to process the stream of tuples using the first cache of the first core, and other factors to calculate an expected number of CPU cycles of "21" (e.g., 3 CPU cycles to read the tuples from the first cache of the first core, 7 cycles to transfer the tuples from the first core to the second, 3 cycles to write the tuples to the first cache of the first core, 3 cycles to read the tuples from the first cache, 3 cycles to process the tuples, and 3 cycles to re-write the modified tuples back to the first cache). In embodiments, a first cache utilization factor of "66" may be computed for the first cache of the first core. Other methods of computing the first cache utilization factor for the first cache of the first core of the set of many-core hardware processors are also possible.

At block 832, a second cache utilization factor for a second cache of a second core of the set of many-core hardware processors may be computed. The computing may be performed for cache management in the stream computing environment. Generally, computing can include formulating, calculating, ascertaining, measuring, estimating, or otherwise determining the second cache utilization factor for the second cache of the second core of the set of many-core hardware processors. The second cache utilization factor many include an attribute, condition, property, criterion, or other parameter that characterizes the current or expected usage, performance, or availability of the second cache of the second core of the set of many-core hardware processors. For instance, the second cache utilization factor may indicate the accessibility (e.g., access burden) of the second cache with respect to the stream of tuples (e.g., quantitatively expressed as an integer between 0 and 100). In embodiments, computing the second cache utilization factor may include calculating an expected number of CPU cycles that would be necessary to process the stream of tuples using the second cache of the second core, and determining the second cache utilization factor for the second cache of the second core based on the expected number of CPU cycles (e.g., where higher expected numbers of CPU cycles correlate with lower cache utilization factors). For instance, with reference to the previous example, consider that the stream of tuples is maintained in a first cache (e.g., L1 cache) of a second core of the set of many-core hardware processors (e.g., such that the stream of tuples are located on the same core as the second cache). Computing may include taking into account the physical distance between the first cache of the second core and the second cache of the second core, the time to transfer the tuples, expected time to process the stream of tuples using the second cache of the second core, and other factors to calculate an expected number of CPU cycles of "10" (e.g., 3 cycles to read the tuples from the first cache of the second core, 7 cycles to write the tuples to the second cache of the second core). In embodiments, a second cache utilization factor of "91" may be computed for the second cache of the second core. Other methods of computing the second cache utilization factor for the second cache of the second core of the set of many-core hardware processors are also possible.

In embodiments, it may be detected that the first cache utilization factor for the first cache of the first core of the set of many-core hardware processors includes a data transfer factor at block 836. The detecting may be performed for cache management in the stream computing environment. Generally, detecting can include sensing, discovering, recognizing, resolving, identifying, or otherwise ascertaining that the first cache utilization factor indicates the data transfer factor. The data transfer factor may include an attribute, property, or characteristic that indicates a burden of data movement between the caches of the first and second cores. The data transfer factor may represent the cost in terms of time, bandwidth, CPU clock cycles, or other system resources incurred by transferring data between caches of the first and second cores. In embodiments, detecting may include computing the data transfer factor based on the physical distance between the first and second cores on a physical processor (e.g., integrated circuit), the bandwidth necessary to transmit data between the first and second cores, and the number of CPU clock cycles used to read data from the cache on the first core and write it to the cache on the second core. As an example, in certain embodiments, it may be determined that transferring data from an L1 cache of a first core to an L2 cache of a second core may result in usage of 17 CPU clock cycles, 0.4 seconds, and 48 kilobytes of network bandwidth. Other methods of detecting that the first cache utilization factor includes the data transfer factor are also possible.

At block 840, a tuple-processing hardware-route on the set of many-core hardware processors may be determined. The determining may be performed based on a cache factor associated with the set of many-core hardware processors. Generally, determining can include formulating, resolving, computing, calculating, identifying, or otherwise ascertaining the tuple-processing hardware route based on the cache factor associated with the set of many-core hardware processors. In embodiments, determining the tuple-processing hardware route may include evaluating the set of many-core hardware processors with respect to the stream of tuples to ascertain a sequence of cache units (e.g., of one or more cores) that define a path for processing the stream of tuples that achieves a suitability threshold (e.g., total processing time below a threshold, efficiency above a certain level). Other methods of determining the tuple-processing hardware route on the set of many-core hardware processors are also possible.

At block 841, the tuple-processing hardware-route may be resolved. The resolving may be performed to prioritize utilization of the second cache of the second core of the set of many-core hardware processors with respect to the first cache of the first core of the set of many-core hardware processors. The resolving may be performed by comparing the first cache utilization factor for the first cache of the first core of the set of many-core hardware processors with the second cache utilization factor for the second cache of the second core of the set of many-core hardware processors. Generally, resolving can include formulating, ascertaining, computing, calculating, identifying, or otherwise determining the tuple-processing hardware route to prioritize utilization of the second cache of the second core with respect to the first cache of the first core. In embodiments, resolving can include comparing the first cache utilization factor for the first cache of the first core with respect to the second cache utilization factor for the second cache of the second core, and selecting the cache having the greater cache utilization factor (e.g., lower expected number of CPU cycles) for use to process the stream of tuples. Consider again the example described herein in which the stream of tuples is maintained in the first cache (e.g., L1 cache) of a second core of the set of many-core hardware processors (e.g., such that the stream of tuples are located on the same core as the second cache). As described herein, the first cache utilization factor of "66" for the L1 cache (e.g., first cache) of the first core may be compared with the second cache utilization factor of "91" for the L2 cache (e.g., second cache) of the second core, and the second cache of the second core may be ascertained for use to facilitate processing of the stream of tuples (e.g., although the L1 cache of the first core is faster, using the L2 cache on the same core as the tuples are located saves transfer time and results in faster overall processing). Accordingly, a tuple-processing hardware-route to transfer the stream of tuples from the L1 cache of the second core to the L2 cache of the second core for processing may be determined. Other methods of resolving the tuple-processing hardware-route to prioritize utilization of the second cache of the second core with respect to the first cache of the first core are also possible.

In embodiments, it may be ascertained that a second cache access burden of the second cache of the second core of the set of many-core hardware processors exceeds a first cache access burden of the first cache of the first core of the set of many-core hardware processors at block 844. The ascertaining may be performed for cache management in the stream computing environment. Generally, ascertaining can include formulating, resolving, computing, calculating, identifying, or otherwise determining that the second cache access burden of the second cache of the second core exceeds the first cache access burden of the first cache of the first core. The first and second cache access burdens may indicate the cost or expense (e.g., in terms of time or system resources) for utilizing the first and second caches, respectively. In embodiments, the first and second cache access burdens may be expressed using a number of CPU clock cycles that are necessary to perform read or write operations using the first and second caches. In embodiments, ascertaining that the second cache access burden of the second cache of the second core exceeds the first cache access burden of the first cache of the first core may include performing a test operation to read and write a set of data to both the second cache of the second core and the first cache of the first core, and measuring the number of CPU clock cycles that are necessary to complete the operation. As an example, in embodiments, a test operation may be performed with respect to an L2 cache (e.g., second cache) of the second core and the L1 cache (e.g., first cache) of the first core, and it may be calculated that it takes 10 CPU clock cycles to write data to the L2 cache of the second core, and 2 CPU clock cycles to write data to the L1 cache of the first core. Accordingly, based on the test operation, it may be determined that the second cache access burden of the second cache of the second core is greater than the first cache access burden of the first cache of the first core. Other methods of ascertaining that the second cache access burden of the second cache of the second core exceeds the first cache access burden of the first cache of the first core are also possible.

At block 860, the stream of tuples may be routed. The routing may be performed based on the tuple-processing hardware-route on the set of many-core hardware processors. Generally, routing can include conveying, relaying, transferring, conducting, sending, or otherwise directing the stream of tuples based on the tuple-processing hardware-route on the set of many-core hardware processors. In embodiments, routing the stream of tuples may include identifying a network path address for each hardware component (e.g., cache) designated by the tuple-processing hardware-route, ascertaining one or more communication buses that may be used to transfer the stream of tuples between each respective component of the tuple-processing hardware-route, and subsequently transmitting the stream of tuples to each hardware component of the tuple-processing hardware-route using the identified communication buses and network path addresses. Other methods of routing the stream of tuples based on the tuple-processing hardware-route are also possible.

At block 871, the second cache of the second core of the set of many-core hardware processors may be prioritized. The second cache may be prioritized with respect to the first cache of the first core of the set of many-core hardware processors. The prioritizing may pertain to processing the stream of tuples utilizing the set of many-core hardware processors. Generally, prioritizing can include arranging, ordering, ranking, organizing, or otherwise giving preference to the second cache of the second core to process the stream of tuples. In embodiments, prioritizing may include generating a cache utilization hierarchy that defines the order of priority or preference in which the caches of the set of many-core hardware processors should be used to process the stream of tuples. Accordingly, the second cache of the second core may be assigned a position in the cache utilization hierarchy that indicates greater priority or preference than the first cache of the first core. Again consider the example described herein in which the stream of tuples is maintained in the first cache (e.g., L1 cache) of the second core of the set of many-core hardware processors (e.g., such that the stream of tuples are located on the same core as the second cache). As described herein, in response to resolving the tuple-processing hardware-route to prioritize utilization of the second cache of the second core with respect to the first cache of the first core (e.g., as the second cache had the greater cache utilization factor) a cache utilization hierarchy may be generated in which the L2 cache of the second core is assigned a priority level of "1" and the L1 cache of the first core is assigned a priority level of "2" (e.g., where lower priority levels indicate greater usage preference). Accordingly, the stream of tuples may be processed based on the cache utilization hierarchy such that the L2 cache of the second core is given preference for tuple processing (e.g., and the L1 cache of the first core is used as a backup). Other methods of prioritizing the second cache of the second core with respect to the first cache of the first core are also possible.

At block 880, the stream of tuples may be processed. The stream of tuples may be processed by the plurality of processing elements which operate on the set of many-core hardware processors. The processing may be performed utilizing the set of many-core hardware processors. Generally, processing can include analyzing, evaluating, altering, investigating, examining, modifying, or otherwise managing the stream of tuples. Processing the stream of tuples may include using one or more processor elements placed on the set of many-core hardware processors to perform a series of processing operations on the stream of tuples to convert input tuples to output tuples. Other methods of processing the stream of tuples by the plurality of processing elements which operate on the set of many-core hardware processors are also possible.

Method 800 concludes at block 899. Aspects of method 800 may provide performance or efficiency benefits related to cache management. Altogether, leveraging processor architecture information and stream application characteristics with respect to cache management may be associated with benefits such as stream application performance, cache hit rates, and processing efficiency. Aspects may save resources such as bandwidth, disk, processing, or memory.

Figure 9:
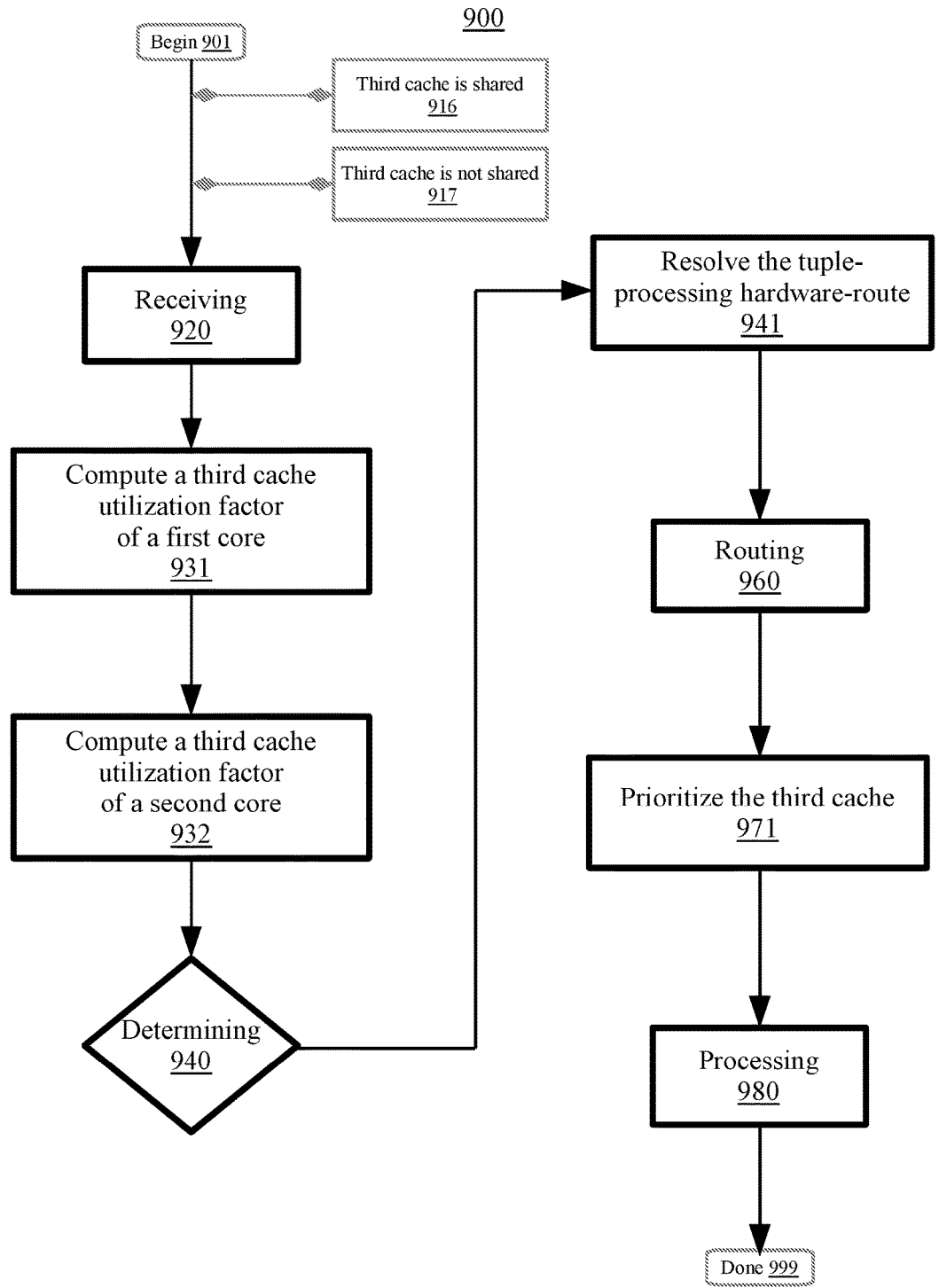
FIG. 9 is a flowchart illustrating a method for cache management in a stream computing environment that uses a set of many-core hardware processors to process a stream of tuples by a plurality of processing elements which operate on the set of many-core hardware processors, according to embodiments.

FIG. 9 is a flowchart illustrating a method 900 for cache management in a stream computing environment that uses a set of many-core hardware processors to process a stream of tuples by a plurality of processing elements which operate on the set of many-core hardware processors, according to embodiments. Aspects of method 900 relate to resolving the tuple-processing hardware-route to prioritize utilization of a third cache of a first core of the set of many-core hardware processors based on computation of utilization factors for the third cache of the first core and the third cache of the second core. Aspects of method 900 may be similar or the same as aspects of method 600/700/800, and aspects may be utilized interchangeably. The method 900 may begin at block 901.

In embodiments, it may be detected that the third cache of the first core of the set of many-core hardware processors is shared with a third core of the set of many-core hardware processors at block 916. The detecting may be performed for cache management in the stream computing environment. Generally, detecting can include sensing, discovering, recognizing, resolving, identifying, or otherwise ascertaining that the third cache of the first core is shared with a third core of the set of many-core hardware processors. In embodiments, detecting may include examining the physical processor architecture of the set of many-core hardware processors, and identifying that both the first core and the third core of a first processor are communicatively connected with the third cache (e.g., have system bus connections linked with the third cache). As an example, detecting may include utilizing a data traffic diagnostic tool to analyze the flow of data on an L3 cache of a first processor, and determining that both the first core and the third core of the first processor make use of the L3 cache for data transfer and communication (e.g., of streams of tuples). Other methods of detecting that the third cache of the first core is shared with the third core are also possible.

In embodiments, it may be detected that the third cache of the second core of the set of many-core hardware processors is neither shared with the first core of the set of many-core hardware processors nor the third core of the set of many-core hardware processors at block 917. The detecting may be performed for cache management in the stream computing environment. Generally, detecting can include sensing, discovering, recognizing, resolving, identifying, or otherwise ascertaining that the third cache of the second core of the set of many-core hardware processors is neither shared with the first core or the third core of the set of many-core hardware processors. In embodiments, detecting may include examining the physical processor architecture of the set of many-core hardware processors, and identifying that a third cache of a second processor does not maintain system bus connections or other communication links with the first or third cores (e.g., of the first processor). As an example, in certain embodiments, detecting may include ascertaining that an L3 cache of a first processor and an L3 cache of the second processor do share communication connections to cores on other processors (e.g., cores on a particular processor are only connected to the L3 cache on that respective processor). Other methods of detecting that the third cache of the second core of the set of many-core hardware processors is neither shared with the first core of the set of many-core hardware processors nor the third core of the set of many-core hardware processors are also possible.

At block 920, the stream of tuples may be received. The stream of tuples may be received to be processed by the plurality of processing elements which operate on the set of many-core hardware processors. Generally, receiving can include sensing, detecting, recognizing, identifying, collecting, or otherwise accepting delivery of the stream of tuples. In embodiments, receiving may include detecting an incoming set of input tuples with respect to a particular core or cores of the set of many-core hardware processors. Other methods of receiving the stream of tuples to be processed by the plurality of processing elements which operate on the set of many-core hardware processors are also possible.

At block 931, a third cache utilization factor for a third cache of a first core of the set of many-core hardware processors may be computed. The computing may be performed for cache management in the stream computing environment. Generally, computing can include formulating, calculating, ascertaining, measuring, estimating, or otherwise determining the third cache utilization factor for the third cache of the first core of the set of many-core hardware processors. The third cache utilization factor may include an attribute, condition, property, criterion, or other parameter that characterizes the current or expected usage, performance, or availability of the third cache of the first core of the set of many-core hardware processors. For instance, the first cache utilization factor may indicate the availability (e.g., degree of congestion) of the third cache with respect to the stream of tuples. In embodiments, the third cache utilization factor may be quantitatively expressed as an integer between 0 and 100, where greater values indicate greater suitability (e.g., easier access, faster expected processing) for processing the stream of tuples. In embodiments, computing the third cache utilization factor for the third cache of the first core may include calculating an expected number of CPU cycles that would be necessary to process the stream of tuples using the third cache of the first core, and determining the third cache utilization factor for the third cache of the first core based on the expected number of CPU cycles (e.g., where higher expected numbers of CPU cycles correlate with lower cache utilization factors). As an example, consider a situation in which a stream of tuples is undergoing processing operations in an L2 cache (e.g., second cache) of the first core, and the third cache of the first core is an L3 cache. Computing may include taking into account the physical distance between the L3 cache of the first core and the L2 cache of the first core, the time to transfer the tuples, the expected time to process the stream of tuples using the L3 cache of the first core, and other factors to calculate an expected number of CPU cycles of "126" (e.g., 3 cycles to transfer from the L2 cache to the L3 cache, 40 cycles to write to the L3 cache, 40 cycles to read from the L3 cache, 3 cycles to process the stream of tuples, 40 cycles to rewrite the modified stream of tuples to the L3 cache). In embodiments, a third cache utilization factor of "46" may be computed for the third cache of the first core. Other methods of computing the third cache utilization factor for the third cache of the first core of the set of many-core hardware processors are also possible.

At block 932, a third cache utilization factor for a third cache of a second core of the set of many-core hardware processors may be computed. The third cache of the first core is a different physical cache from the third cache of the second core. The computing may be performed for cache management in the stream computing environment. Generally, computing can include formulating, calculating, ascertaining, measuring, estimating, or otherwise determining the third cache utilization factor for the third cache of the second core of the set of many-core hardware processors. The third cache utilization factor many include an attribute, condition, property, criterion, or other parameter that characterizes the current or expected usage, performance, or availability of the third cache of the second core of the set of many-core hardware processors. For instance, the third cache utilization factor may indicate the availability (e.g., degree of congestion) of the third cache with respect to the stream of tuples (e.g., quantitatively expressed as an integer between 0 and 100). In embodiments, the third cache of the first core may be a different physical cache from the third cache of the second core. As an example, in certain embodiments, the third cache of the first core may be located on a first hardware processor and the third cache of the second core may be located on a second hardware processor (e.g., such that the third caches are located on separate physical hardware units). In embodiments, computing the third cache utilization factor for the third cache of the second core may include calculating an expected number of CPU cycles that would be necessary to process the stream of tuples using the third cache of the second core, and determining the third cache utilization factor for the third cache of the second core based on the expected number of CPU cycles (e.g., where higher expected numbers of CPU cycles correlate with lower cache utilization factors). For instance, with reference to the previous example, consider that the stream of tuples is undergoing processing operations in an L2 cache (e.g., second cache) of the first core, and the third cache of the second core is an L3 cache (e.g., such that the stream of tuples and the L3 cache). Computing may include taking into account the physical distance between the L2 cache of the first core and the L3 cache of the second core, the time to transfer the tuples, expected time to process the stream of tuples using the third cache of the second core, and other factors to calculate an expected number of CPU cycles of "200" (e.g., 7 cycles to read from the L2 cache, 70 cycles to transfer from the L2 cache on the first core to the L3 cache on the second core, 40 cycles to write to the L3 cache, 40 cycles to read from the L3 cache, 3 cycles to process the stream of tuples, 40 cycles to rewrite the modified stream of tuples to the L3 cache). In embodiments, a second cache utilization factor of "21" may be computed for the third cache of the second core. Other methods of computing the third cache utilization factor for the third cache of the second core of the set of many-core hardware processors are also possible.

At block 940, a tuple-processing hardware-route on the set of many-core hardware processors may be determined. The determining may be performed based on a cache factor associated with the set of many-core hardware processors. Generally, determining can include formulating, resolving, computing, calculating, identifying, or otherwise ascertaining the tuple-processing hardware route based on the cache factor associated with the set of many-core hardware processors. In embodiments, determining the tuple-processing hardware route may include evaluating the set of many-core hardware processors with respect to the stream of tuples to ascertain a sequence of cache units (e.g., of one or more cores) that define a path for processing the stream of tuples that achieves a suitability threshold (e.g., total processing time below a threshold, efficiency above a certain level). Other methods of determining the tuple-processing hardware route on the set of many-core hardware processors are also possible.

At block 941, the tuple-processing hardware-route may be resolved. The resolving may be performed to prioritize utilization of the third cache of the first core of the set of many-core hardware processors with respect to the third cache of the second core of the set of many-core hardware processors. The resolving may be performed by comparing the third cache utilization factor for the third cache of the first core of the set of many-core hardware processors with the third cache utilization factor for the third cache of the second core of the set of many-core hardware processors. Generally, resolving can include formulating, ascertaining, computing, calculating, identifying, or otherwise determining the tuple-processing hardware route to prioritize utilization of the third cache of the first core with respect to the third cache of the second core. In embodiments, resolving can include comparing the third cache utilization factor for the third cache of the first core with respect to the third cache utilization factor for the third cache of the second core, and selecting the cache having the greater cache utilization factor (e.g., lower expected number of CPU cycles) for use to process the stream of tuples. Consider again the example described herein in which the stream of tuples is undergoing processing operations in an L2 cache (e.g., second cache) of the first core, and both the third cache of the first core and the third cache of the second core are L3 caches (e.g., such that the stream of tuples and the L3 cache are located on different cores). As described herein, the third cache utilization factor of "46" for the L3 cache of the first core may be compared with the second cache utilization factor of "21" for the L3 cache of the second core, and the third cache of the first core may be ascertained for use to facilitate processing of the stream of tuples (e.g., using the L3 cache on the same core as the stream of tuples may avoid the need to transfer the tuples, resulting in faster overall processing). Accordingly, a tuple-processing hardware-route to transfer the stream of tuples from the L2 cache of the first core to the L3 cache of the first core for processing may be determined. Other methods of resolving the tuple-processing hardware-route to prioritize utilization of the third cache of the first core with respect to the third cache of the second core are also possible.

At block 960, the stream of tuples may be routed. The routing may be performed based on the tuple-processing hardware-route on the set of many-core hardware processors. Generally, routing can include conveying, relaying, transferring, conducting, sending, or otherwise directing the stream of tuples based on the tuple-processing hardware-route on the set of many-core hardware processors. In embodiments, routing the stream of tuples may include identifying a network path address for each hardware component (e.g., cache) designated by the tuple-processing hardware-route, ascertaining one or more communication buses that may be used to transfer the stream of tuples between each respective component of the tuple-processing hardware-route, and subsequently transmitting the stream of tuples to each hardware component of the tuple-processing hardware-route using the identified communication buses and network path addresses. Other methods of routing the stream of tuples based on the tuple-processing hardware-route are also possible.

At block 971, the third cache of the first core of the set of many-core hardware processors may be prioritized. The third cache of the first core may be prioritized with respect to the third cache of the second core of the set of many-core hardware processors. The prioritizing may pertain to processing the stream of tuples utilizing the set of many-core hardware processors. Generally, prioritizing can include arranging, ordering, ranking, organizing, or otherwise giving preference to the third cache of the first core to process the stream of tuples. In embodiments, prioritizing may include generating a cache utilization hierarchy that defines the order of priority or preference in which the caches of the set of many-core hardware processors should be used to process the stream of tuples. Accordingly, the third cache of the first core may be assigned a position in the cache utilization hierarchy that indicates greater priority or preference than the third cache of the second core. Again consider the example described herein in which the stream of tuples is undergoing processing operations in an L2 cache (e.g., second cache) of the first core, and both the third cache of the first core and the third cache of the second core are L3 caches (e.g., such that the stream of tuples and the L3 cache are located on different cores). As described herein, in response to resolving the tuple-processing hardware-route to prioritize utilization of the L3 cache of the first core with respect to the L3 cache of the second core (e.g., as the L3 on the first core had the greater cache utilization factor) a cache utilization hierarchy may be generated in which the L3 cache of the first core is assigned a priority level of "1" and the L3 cache of the second core is assigned a priority level of "2" (e.g., where lower priority levels indicate greater usage preference). Accordingly, the stream of tuples may be processed based on the cache utilization hierarchy such that the L3 cache of the first core is given preference for tuple processing (e.g., and the L3 cache of the second core is used as a backup). Other methods of prioritizing the third cache of the first core with respect to the third cache of the second core are also possible.

At block 980, the stream of tuples may be processed. The stream of tuples may be processed by the plurality of processing elements which operate on the set of many-core hardware processors. The processing may be performed utilizing the set of many-core hardware processors. Generally, processing can include analyzing, evaluating, altering, investigating, examining, modifying, or otherwise managing the stream of tuples. Processing the stream of tuples may include using one or more processor elements placed on the set of many-core hardware processors to perform a series of processing operations on the stream of tuples to convert input tuples to output tuples. Other methods of processing the stream of tuples by the plurality of processing elements which operate on the set of many-core hardware processors are also possible.

Method 900 concludes at block 999. Aspects of method 900 may provide performance or efficiency benefits related to cache management. Altogether, leveraging processor architecture information and stream application characteristics with respect to cache management may be associated with benefits such as stream application performance, cache hit rates, and processing efficiency. Aspects may save resources such as bandwidth, disk, processing, or memory.

Figure 10:
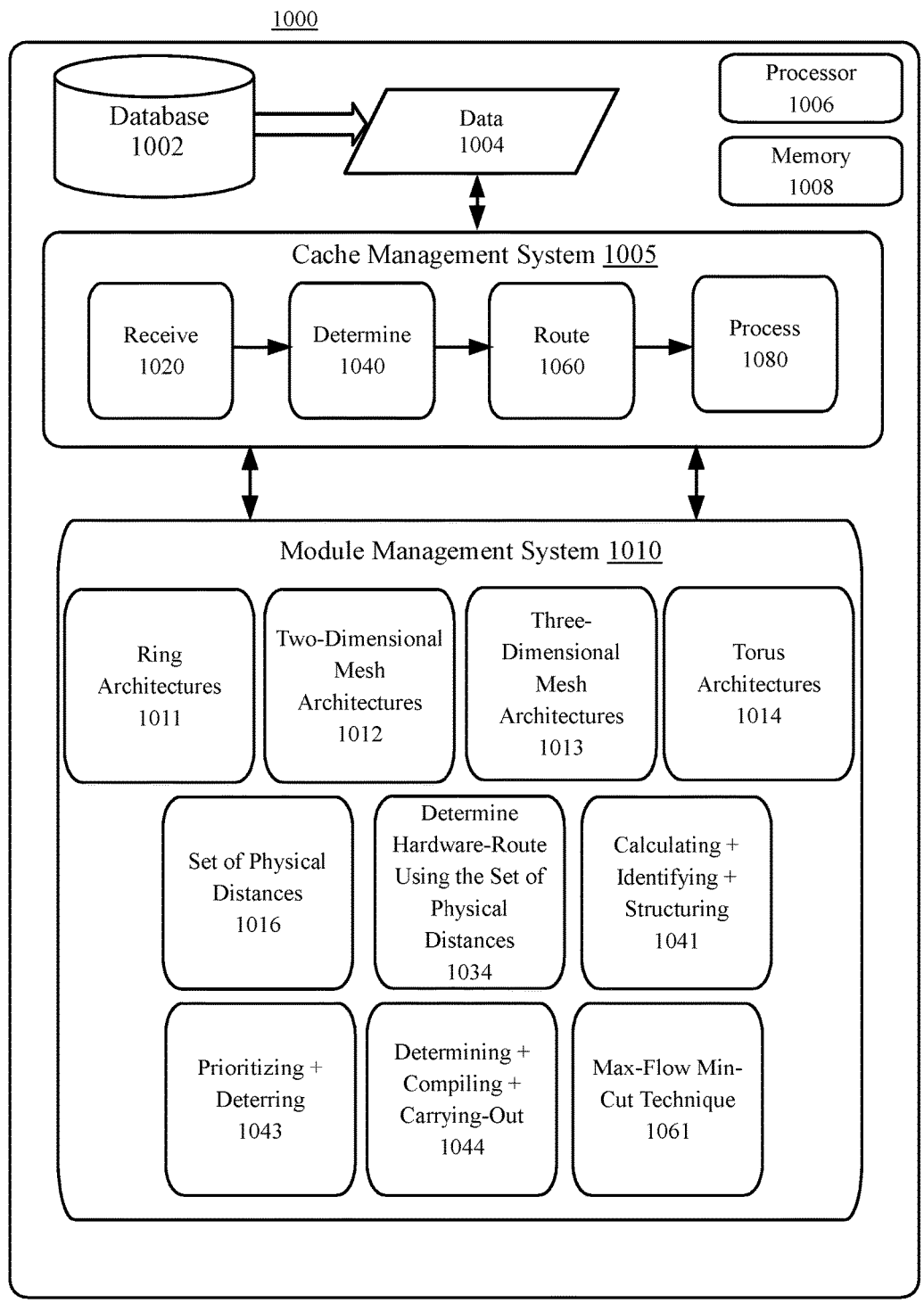
FIG. 10 depicts an example system for cache management in a stream computing environment that uses a set of many-core hardware processors to process a stream of tuples by a plurality of processing elements which operate on the set of many-core hardware processors, according to embodiments.

FIG. 10 depicts an example system 1000 for cache management in a stream computing environment that uses a set of many-core hardware processors to process a stream of tuples by a plurality of processing elements which operate on the set of many-core hardware processors, according to embodiments. The example system 1000 may include a processor 1006 and a memory 1008 to facilitate implementation of cache management. The example system 1000 may include a database 1002 configured to maintain data used for cache management. In embodiments, the example system 1000 may include a cache management system 1005. The cache management system 1005 may be communicatively connected to the database 1002, and be configured to receive data 1004 related to cache management. The cache management system 1005 may include a receiving module 1020 to receive the stream of tuples, a determining module 1040 to determine a tuple-processing hardware-route, a routing module 1060 to route the stream of tuples, and a processing module 1080 to process the stream of tuples. The cache management system 1005 may be communicatively connected with a module management system 1010 that includes a set of modules for implementing aspects of cache management.

In embodiments, it may be detected that the set of many-core hardware processors is selected from a group. In embodiments, the set of many-core hardware processors may include one or more ring architectures at module 1011. The ring architecture may include a processor infrastructure for facilitating data protection and fault tolerance using a set of protection rings to manage access to different levels of system resources. The set of protection rings may include one or more hardware-reinforced hierarchical levels or layers of privilege within the computer system. The set of protection rings may be arranged in a hierarchy from most privileged to least privileged (e.g., Ring 0 may be the most privileged, and interact directly with physical hardware such as CPU and memory). The set of protection rings may be used to manage (e.g., gate, limit) access to system resources (e.g., device drivers, CPU, memory). In embodiments, the set of many-core hardware processors may include one or more two-dimensional mesh architectures at module 1012. The two-dimensional mesh architecture may include a processor infrastructure including an array of processor nodes which form a two-dimensional grid where each node is connected to four adjacent routing nodes (e.g., nodes at the edges may only have two or three connections). In embodiments, the set of many-core hardware processors may include one or more three-dimensional mesh architectures at module 1013. The three-dimensional architecture may include a processor infrastructure including an array of processor nodes which form a three-dimensional grid. Each node of the three-dimensional grid may be connected to 5 or 6 connections to other nodes of the grid. In embodiments, the set of many-core hardware processors may include one or more torus architectures at module 1014. The torus architecture may include a processor infrastructure including an array of processor nodes which form a regular cyclic two-dimensional grid. The torus architecture may include wrap-around edges such that nodes at the edge of the grid may be connected to those nodes in a corresponding location on the other side of the grid. Other types of processor architectures for the set of many-core hardware processors are also possible.

In embodiments, the cache factor associated with the set of many-core hardware processors may be configured at module 1016. The cache factor may be configured to include a set of physical distances between a plurality of cores of the set of many-core hardware processors. The configuring may be performed for cache management in the stream computing environment. Generally, configuring can include formulating, arranging, calculating, setting-up, computing, or otherwise organizing the cache factor to include the set of physical distances. The set of physical distances may include the length of a path between the one or more cores of the set of many-core hardware processors. In embodiments, the set of physical distances may indicate the length of the path between two cores located on the same processor (e.g., a first core and a second core of a first processor). For instance, configuring may include ascertaining a physical distance between two cores located on the same processor of "5 millimeters." In embodiments, the set of physical distances may indicate the length of the path between two cores located on separate processors (e.g., a first core on a first processor and a second core on a second processor). As an example, configuring may include computing a physical distance between two cores located on separate processors of "10 centimeters." In embodiments, configuring may include factoring in (e.g., taking into consideration) the set of physical distances between processor cores when calculating the cache factor (e.g., a shorter physical distance may be associated with faster processing time). Other methods of configuring the cache factor to include the set of physical distances between a plurality of cores of the set of many-core hardware processors are also possible.

In embodiments, the tuple-processing hardware-route on the set of many-core hardware processors may be determined at module 1034. The tuple-processing hardware-route may be determined using the set of physical distances. The determining may be performed to route the stream of tuples a shorter distance between cores. Generally, determining can include formulating, resolving, computing, calculating, identifying, or otherwise ascertaining to route the stream of tuples a shorter distance between cores using the set of physical distances. In embodiments, determining may include examining the set of physical distances between the current location of the stream of tuples and one or more cores of the set of many-core hardware processors, and selecting a tuple-processing hardware route that achieves a physical distance less than a routing distance threshold. Consider the following example. A set of tuples may be located in a second cache (e.g., L2 cache) of a third core of a fourth processor. Accordingly, a set of physical distances between the second cache of the third core of the fourth processor and other cores of the set of many-core hardware processors may be examined. For example, it may be determined that a fourth core of the fourth processor is 5 millimeters from the third core of the fourth processor, a first core of a second processor is 7 centimeters from the third core of the fourth processor, and a fifth core of a third processor is 11 centimeters from the third core of the fourth processor. Accordingly, the physical distances for each potential route may be compared with respect to a routing distance threshold of "2 centimeters" and the fourth core of the fourth processor may be selected to process the set of tuples (e.g., 5 millimeters is the only distance that achieves the routing distance threshold). As such, the set of tuples may be routed to the fourth core of the fourth processor for processing (e.g., thereby using less bandwidth, decreasing excess traffic, reducing wait times for processing tuples). Other methods of determining the tuple-processing hardware route to route the stream of tuples a shorter distance between cores are also possible.

In embodiments, an expected data rate may be calculated at module 1041. The expected data rate may be calculated for operation of a plurality of sequential stream operators. The calculating may be performed for cache management in the stream computing environment. Generally, calculating can include formulating, resolving, computing, estimating, identifying, ascertaining, or otherwise determining the expected data rate for operation of the plurality of sequential stream operators. The plurality of sequential stream operators may include a collection of consecutive stream operators or processing elements. In embodiments, the output of a first stream operator may be connected to the input of a second stream operator so that data may directly passed between stream operators without the need to save data in a cache (e.g., L2 cache, cache of another processor). In embodiments, the plurality of sequential stream operators may be configured to take turns executing instructions to facilitate expedient tuple processing (e.g., eliminate waiting). The expected data rate may include an indication of the forecasted number of bits (e.g., basic unit of information) that are conveyed or processed to one or more cores of the set of many-core hardware processors per unit of time. In embodiments, the expected data rate may represent the predicted amount of data (e.g., number of tuples, size of a data block) that are scheduled for processing by the plurality of sequential stream operators or storage in a cache of one or more cores of the set of many-core hardware processors. As examples, the expected data rate may include measurements such as "509 tuples per second," "12 data blocks per second," "84 megabits per second" or the like. In embodiments, calculating the expected data rate may include using a stream data traffic diagnostic application to monitor the stream computing environment to compute an estimate of the amount of incoming data that is scheduled for processing on a particular processor core. In embodiments, calculating the expected data rate may include examining historical data traffic information for the stream computing environment to ascertain the expected amount of data traffic for a particular processor core at a certain time (e.g., data traffic peaks at 12:00 PM, experiences a lull at 10:30 PM). Other methods of calculating the expected data rate for operation of a plurality of sequential stream operators are also possible.

It may be identified that a threshold data rate for a single core of the set of many-core hardware processors exceeds the expected data rate for operation of the plurality of sequential stream operators. The identifying may be performed for cache management in the stream computing environment. Generally, identifying can include sensing, discovering, recognizing, resolving, detecting, or otherwise ascertaining that the threshold data rate for a single core of the set of many-core hardware processes exceeds the expected data rate for operation of the plurality of sequential stream operators. The threshold data rate may include a maximum, cap, ceiling, benchmark, or target data rate with respect to data processing by the plurality of sequential stream operators of a single core (e.g., greatest amount of data that the single core can maintain/store/process per unit time). For instance, the threshold data rate may include a maximum data rate of "50 megabits per second." In embodiments, identifying may include comparing the expected data rate with respect to the threshold data rate to ascertain a relationship between the magnitude of the expected data rate and the threshold data rate. As an example, in embodiments, an expected data rate of "360 tuples per second" may be compared with respect to a threshold data rate of "400 tuples per second," and it may be identified that the threshold data rate exceeds the expected data rate (e.g., the plurality of sequential stream operators may be able to handle the expected data rate). Other methods of identifying that the threshold data rate for the single core exceeds the expected data rate for operation of the plurality of sequential stream operators are also possible.

In embodiments, the placement arrangement may be structured. The placement arrangement may be structured to deploy the plurality of sequential stream operators on the single core of the set of many-core hardware processors. The structuring may be performed for cache management in the stream computing environment. Generally, structuring can include building, forming, organizing, assembling, creating, constructing, arranging, or otherwise establishing the placement arrangement. The placement arrangement may include a configuration, organization, or framework that defines how and where the plurality of sequential stream operators are distributed within the stream computing environment. The placement arrangement may indicate the type of stream operators (e.g., join, filter, sort, functor), the processor core on which they are placed (e.g., fourth core of the second processor), the order in which they are arranged (e.g., filter operator followed by a sort operator followed by a join operator), and other information that characterizes the manner in which the plurality of sequential stream operators are distributed. In embodiments, structuring may include allocating the plurality of sequential stream operators to the single core (e.g., same single core) of the set of many-core hardware processors. As an example, structuring may include deploying a plurality of sequential stream operators including a pair of filter operators to a third core of a fifth hardware processor. As such, the pair of filter operators may take turns filtering the incoming stream of tuples to facilitate expedient tuple processing. Other methods of structuring the placement arrangement to deploy the plurality of sequential stream operators on the single core of the set of many-core hardware processors are also possible.

In embodiments, a set of cache hits may be managed at module 1043. The managing may be performed for cache management in the stream computing environment. The set of cache hits may be managed by prioritizing and deterring. A single job tenancy characteristic may be prioritized based on the cache factor associated with the set of many-core hardware processors. Generally, prioritizing can include arranging, ordering, ranking, organizing, or otherwise giving preference to the single job tenancy characteristic. The single job tenancy characteristic may include a property, attribute, or trait that indicates that a particular processing unit (e.g., processor or individual core) is dedicated to a single job (e.g., task, processing operation). In embodiments, prioritizing the single job tenancy characteristic may include distributing stream operators across cores of the set of many-core hardware processors. For instance, with respect to a set of many-core hardware processors having three processors each having four cores, prioritizing the single job tenancy characteristic may include assigning one job to each of the twelve cores (e.g., rather than assigning multiple jobs to the same core). In embodiments, a multiple job tenancy characteristic may be deterred. The deterring may be performed based on the cache factor associated with the set of many-core hardware processors. Generally, deterring can include limiting, restricting, avoiding, inhibiting, or otherwise mitigating the multi job tenancy characteristic. The multiple job tenancy characteristic may include a property, attribute, or trait that indicates that a particular processing unit (e.g., processor or individual core) is discouraged from hosting a plurality of jobs. In embodiments, deterring the multiple job tenancy characteristic may include preventing or blocking assignment of stream operators to cores that already have at least one stream operator. In embodiments, prioritizing the single job tenancy characteristic and deterring the multiple job tenancy characteristic may include managing the set of many-core hardware processors to achieve a job density value below a job density threshold (e.g., 1.6 jobs per core may achieve a job density threshold of 2 jobs per core). As such, cache hits may be facilitated with respect to the set of many-core hardware processors. Other methods of managing the set of cache hits by prioritizing the single job tenancy characteristic and deterring the multiple job tenancy characteristic are also possible.

In embodiments, a placement arrangement for a set of stream operators on the set of many-core hardware processors may be determined at module 1044. The determining may be performed based on the tuple-processing hardware-route on the set of many-core hardware processors. Generally, determining can include formulating, resolving, computing, calculating, identifying, or otherwise ascertaining the placement arrangement for the set of stream operators based on the tuple-processing hardware-route. The placement arrangement may include a configuration, organization, or framework that defines how and where the plurality of sequential stream operators are distributed within the stream computing environment. The placement arrangement may indicate the type of stream operators (e.g., join, filter, sort, functor), the processor core on which they are placed (e.g., fifth core of the third processor), the order in which they are arranged (e.g., join operator followed by a filter operator followed by a functor operator), and other information that characterizes the manner in which the plurality of sequential stream operators are distributed. In embodiments, determining the placement arrangement may include examining the tuple-processing hardware-route to ascertain which cores of which processors the stream of tuples is scheduled to be processed by, and subsequently selecting a plurality of stream operators for assignment to the cores by which the stream of tuples is scheduled to be processed. As an example, based on a tuple-processing hardware-route that indicates that the stream of tuples are to be processed using an L2 cache of a first core of a first processor, an L2 cache of a third core of the first processor, and an L1 cache of a fourth core of a second processor, determining the placement arrangement may include ascertaining to assign a first stream operator (e.g., filter operator) to the first core of the first processor, a second stream operator (e.g., sort operator) to the third core of the first processor, and a third stream operator (e.g., join operator) to the fourth core of the second processor. Other methods of determining the placement arrangement based on the tuple-processing hardware-route are also possible.

A stream computing application may be compiled. The stream computing application may use the placement arrangement for the set of stream operators on the set of many-core hardware processors. The compiling may be performed for cache management in the stream computing environment. Generally, compiling can include building, arranging, organizing, assembling, constructing, generating, or otherwise structuring the stream computing application which uses the placement arrangement for the set of stream operators. The stream computing application may include a software program, module, or other collection of executable computing code configured to perform a particular function in the stream computing environment (e.g., monitor financial transactions, aggregate weather data). In embodiments, compiling can include transforming a set of source code that defines functions for the set of stream operators into a single executable unit in a target computing language (e.g., assembly language, machine code). In embodiments, compiling the stream computing application may include constructing the single executable unit based on the placement arrangement, such that the set of stream operators are configured for operation (e.g., compatible operating system, pre-loaded device drivers) on the processing units (e.g., hardware processors and cores) indicated by the tuple-processing hardware-route. In embodiments, the stream computing application may be carried-out. The carrying-out may be performed utilizing the set of many-core hardware processors to process the stream of tuples by the plurality of processing elements which operate on the set of many-core hardware processors. Generally, carrying-out can include implementing, instantiating, initiating, utilizing, running, or otherwise executing the stream computing application to process the stream of tuples by the plurality of processing elements of the set of many-core hardware processors. In embodiments, carrying-out may include using an operating system-level task scheduler to assign system resources to the plurality of processing elements deployed on the set of many-core hardware processors to perform processing operations on the stream of tuples. As an example, carrying-out may include allocating CPU usage, memory, and system bus prioritization to a filter operation on a second core of a third processor, a functor operator on a third core of the third processor, and a barrier operator of a first core on a first processor to process the stream of tuples. Other methods of compiling and carrying-out the stream computing application are also possible.

In embodiments, the stream of tuples may be routed based on a max-flow min-cut technique at module 1061. The routing may be performed for cache management in the stream computing environment. Generally, routing can include conveying, relaying, transferring, conducting, sending, or otherwise directing the stream of tuples based on the max-flow min-cut technique. The max-flow min-cut technique may include a method for promoting data flow in the stream computing environment (e.g., the maximum amount of flow passing from the source to the sink is equal to the total weight of the wedges in the minimum cut). Routing the stream of tuples based on the max-flow min-cut technique may include examining the physical and logical topology of the stream computing environment, and identifying the path that may be used to route the greatest number of tuples to a destination over the shortest distance. In embodiments, the max-flow min-cut technique may applied differently based on the nature of the processor architecture. Consider an example in which the processor architecture includes a ring architecture. Accordingly, routing the stream of tuples using the max-flow min-cut technique may include transmitting tuples to a neighboring core on the same cycle (e.g., the closest core on the same processor). In the event that the neighboring core is occupied with a current workload, the next closest core may be selected as the destination for the stream of tuples. Other methods of routing the stream of tuples based on the max-flow min-cut technique are also possible.

Figure 11:
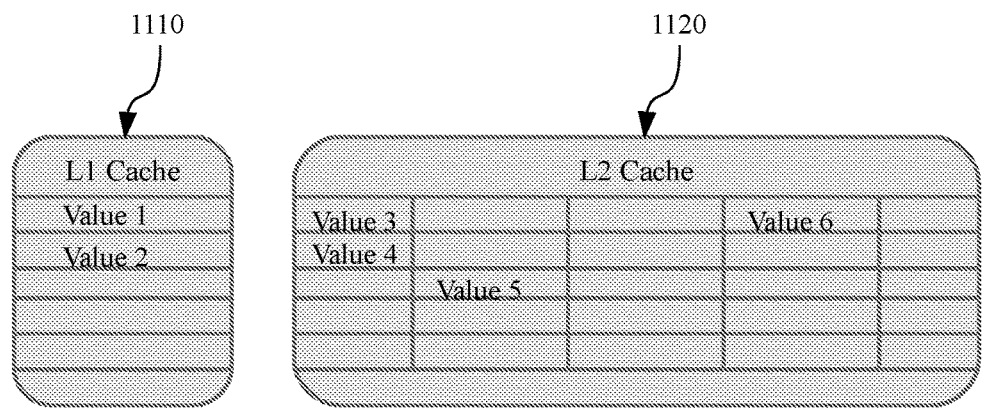
FIG. 11 illustrates an example of cache management in a stream computing environment that uses a set of many-core hardware processors to process a stream of tuples by a plurality of processing elements which operate on the set of many-core hardware processors, according to embodiments.

FIG. 11 illustrates an example system 1100 for cache management in a stream computing environment that uses a set of many-core hardware processors to process a stream of tuples by a plurality of processing elements which operate on the set of many-core hardware processors, according to embodiments. Aspects of FIG. 11 relate to an L1 cache 1110 and an L2 cache 1120 that may be used to maintain a stream of tuples for processing. As described herein, the L2 cache 1120 may have a cache size that exceeds the cache size of the L1 cache 1110. For instance, the L2 cache 1120 may have a cache size of between 512 kilobytes and 4 megabytes, and the L1 cache 1110 may have a cache size of 32-64 kilobytes. In embodiments, the L2 cache 1120 may have a cache access burden that exceeds the cache access burden of the L1 cache 1110. As an example, the L1 cache 1110 may have a cache access burden of 2-4 CPU clock cycles, and the L2 cache 1120 may have a cache access burden of 7-20 CPU clock cycles. Other types of caches are also possible.

FIG. 12 illustrates an example system 1200 for cache management in a stream computing environment that uses a set of many-core hardware processors to process a stream of tuples by a plurality of processing elements which operate on the set of many-core hardware processors, according to embodiments. Aspects of FIG. 12 illustrate a method of managing a cache to facilitate instruction processing in a stream computing environment. In embodiments, cache slot 1 1210 and cache slot 2 1220 may be used to store constant values of 1 and 2, respectively. Cache slot 3 1230 may be used for calculation of variable "X" and cache slot 4 1240 may be used for calculation of variable "Y." In embodiments, as shown herein, an existing value may be overwritten (e.g., using a least recently used algorithm) to store the calculation for the variable "Z." Other methods of cache management in a stream computing environment are also possible.

FIG. 13 illustrates an example system 1300 for cache management in a stream computing environment that uses a set of many-core hardware processors to process a stream of tuples by a plurality of processing elements which operate on the set of many-core hardware processors, according to embodiments. Aspects of FIG. 13 relate to managing an L1 cache 1350 with respect to a stream computing application. The L1 cache 1350 may receive a set of received values (e.g., marked "Recv") and generate a set of sending values (e.g., marked send). In embodiments, each pair of values that are received together may be summed (e.g., Send(1)=Recv(1)+Recv(2), Send(2)=Recv(2)+Recv(3), Send(3)=Recv(3)+Recv(4)). In embodiments, aspects of the disclosure relate to managing L1 cache 1350 based on a cache factor to facilitate efficient instruction processing. For instance, based on a cache factor that indicates that the L1 cache 1350 can hold up to 15 values and that any given calculation requires three value slots (e.g., two value slots for inputs and one value slot for a result), the cache may be managed to detect when a subsequent calculation may fill up the L1 cache 1350 (e.g., 12 slots are currently full, and a stream of tuples requiring computation is incoming), and values may be transferred to an L2 cache before the L1 cache 1350 is full (e.g., to avoid wasting CPU cycles transferring values after the L1 cache 1350 is full). As such, processor stalls due to L2 cache transfers may be avoided, resulting in positive impacts with respect to value computation time and cache hit frequency. Other methods of cache management are also possible.

Figure 14:
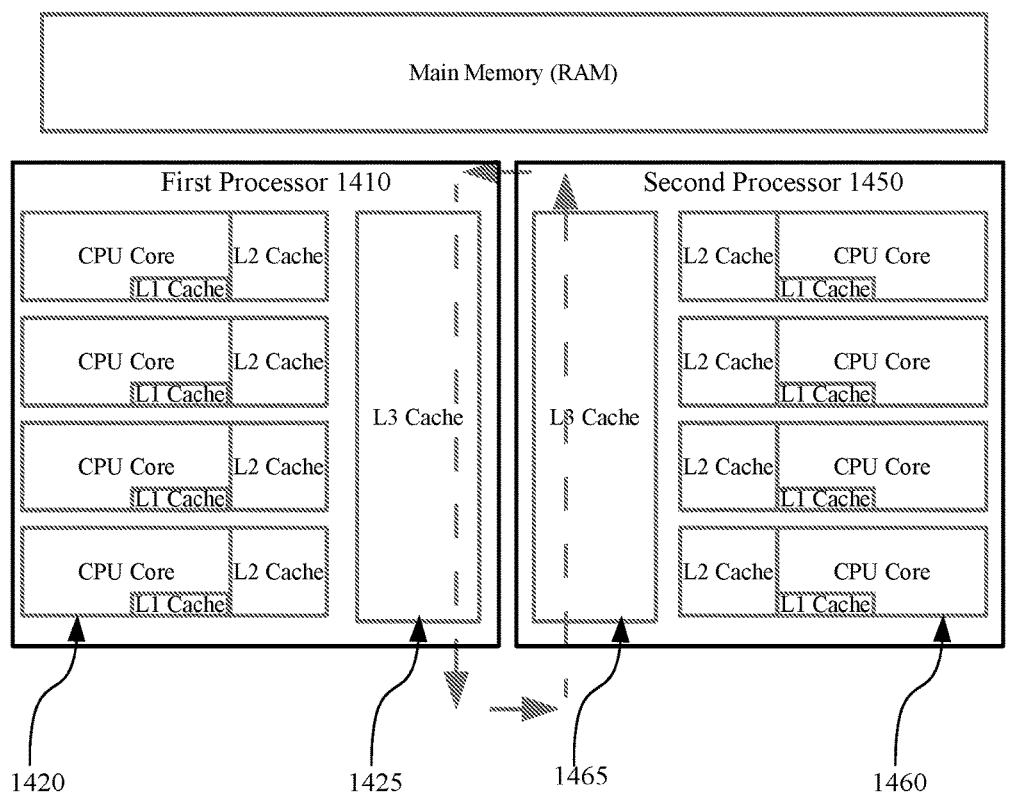
FIG. 14 illustrates an example system architecture of a set of many-core hardware processors, according to embodiments.

FIG. 14 illustrates an example system architecture 1400 of a set of many-core hardware processors, according to embodiments. The example system architecture 1400 may include a first processor 1410 and a second processor 1450. The first processor 1410 may include a first set of CPU cores 1420 and the second processor 1450 may include a second set of CPU cores 1460. In embodiments, both the first set of CPU cores 1420 and the second set of CPU cores 1460 may include a local L1 cache and an L2 cache. The first set of CPU cores 1420 may share use of a first L3 cache 1425, and the second set of CPU cores 1460 may share use of a second L3 cache 1465. One or more cores of the first set of CPU cores 1420 and the second set of CPU cores 1460 may host stream operators for processing a stream of tuples from the stream computing environment. In embodiments, as described herein, aspects of the disclosure relate to determining a tuple-processing hardware route based on a cache factor associated with the set of many-core hardware processors, and routing a stream of tuples based on the tuple-processing hardware route for processing utilizing the set of many-core hardware processors. Accordingly, leveraging processor architecture information and stream application characteristics with respect to cache management may be associated with benefits such as stream application performance, cache hit rates, and processing efficiency In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method for cache management in a stream computing environment that uses a set of many-core hardware processors to process a stream of tuples by a plurality of processing elements which operate on the set of many-core hardware processors, the method comprising:

detecting, for cache management in a stream computing environment, that a first cache and a second cache of a first core of a set of many-core hardware processors are local caches to the first core of the set of many-core hardware processors;

ascertaining using a system hardware diagnostic, for cache management in the stream computing environment, that a second cache size of the second cache of the first core of the set of many-core hardware processors exceeds a first cache size of the first cache of the first core of the set of many-core hardware processors, the second cache size and the first cache size indicating an amount of data storage available to the first cache and the second cache;

receiving a stream of tuples to be processed by a plurality of processing elements which operate on the set of many-core hardware processors;

computing, for cache management in the stream computing environment, a first cache utilization factor for the first cache of the first core of the set of many-core hardware processors;

computing, for cache management in the stream computing environment, a second cache utilization factor for the second cache of the first core of the set of many-core hardware processors;

determining, based on a cache factor associated with the set of many-core hardware processors, a tuple-processing hardware-route on the set of many-core hardware processors;

resolving, by comparing the first cache utilization factor for the first cache of the first core of the set of many-core hardware processors with the second cache utilization factor for the second cache of the first core of the set of many-core hardware processors, the tuple-processing hardware-route to prioritize utilization of the first cache of the first core of the set of many-core hardware processors with respect to the second cache of the first core of the set of many-core hardware processors;

ascertaining, for cache management in the stream computing environment, that a second cache access burden of the second cache of the first core of the set of many-core hardware processors exceeds a first cache access burden of the first cache of the first core of the set of many-core hardware processors;

routing, based on the tuple-processing hardware-route on the set of many-core hardware processors, the stream of tuples;

prioritizing, pertaining to processing the stream of tuples utilizing the set of many-core hardware processors, the first cache of the first core of the set of many-core hardware processors with respect to the second cache of the first core of the set of many-core hardware processors; and processing, utilizing the set of many-core hardware processors, the stream of tuples by the plurality of processing elements which operate on the set of many-core hardware processors.

* * * * *